United States Patent
Myoung et al.

(10) Patent No.: US 10,165,566 B2
(45) Date of Patent: Dec. 25, 2018

(54) TRANSMITTER AND METHOD USING CARRIER AGGREGATION

(71) Applicant: Samsung Electronics Co., Ltd., Gyeonggi-do (KR)

(72) Inventors: Seongsik Myoung, Gyeonggi-do (KR); Thomas Byunghak Cho, Gyeonggi-do (KR); Seungchan Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 81 days.

(21) Appl. No.: 15/131,572

(22) Filed: Apr. 18, 2016

(65) Prior Publication Data

US 2016/0309535 A1  Oct. 20, 2016

(30) Foreign Application Priority Data

Apr. 17, 2015 (KR) .................. 10-2015-0054780
Aug. 24, 2015 (KR) .................. 10-2015-0118853

(51) Int. Cl.
*H04W 72/04* (2009.01)
*H04B 1/00* (2006.01)
*H04L 5/00* (2006.01)

(52) U.S. Cl.
CPC ........ *H04W 72/0453* (2013.01); *H04B 1/005* (2013.01); *H04L 5/001* (2013.01); *H04L 5/0098* (2013.01)

(58) Field of Classification Search
CPC .... H04W 72/0453; H04B 1/005; H04L 5/001; H04L 5/0098
See application file for complete search history.

(56) References Cited

U.S. PATENT DOCUMENTS

| | | | |
|---|---|---|---|
| 6,535,720 B1 | 3/2003 | Kintis et al. | |
| 7,206,557 B2 | 4/2007 | Aytur et al. | |
| 8,150,478 B2 | 4/2012 | Perets et al. | |
| 8,565,352 B2 | 10/2013 | Park et al. | |
| 8,818,441 B2 | 8/2014 | Haim et al. | |
| 2002/0171529 A1* | 11/2002 | Tang | G06K 19/07718 336/200 |
| 2004/0183769 A1* | 9/2004 | Schreyer | G09G 5/005 345/99 |
| 2009/0251348 A1* | 10/2009 | Zhao | H04B 1/28 341/155 |

(Continued)

OTHER PUBLICATIONS

Bassam, Seyed Aidin et al., Transmitter Architecture for CA, IEEE Microwave Magazine, Jul./Aug. 2013, Copyright 2013 IEEE, pp. 78-86.

*Primary Examiner* — Walter J Divito
(74) *Attorney, Agent, or Firm* — The Farrell Law Firm, P.C.

(57) ABSTRACT

Disclosed are a transmitter and method of combining multiple contiguous and non-contiguous frequency bands in a wireless communication system using carrier aggregation. The transmitter includes a first communication unit for converting a first baseband signal into a first RF signal of a first band, a second communication unit for converting a second baseband signal into a second RF signal of a second band, a combiner for outputting a third RF signal by combining the first RF signal and the second RF signal, and an amplifier for amplifying the third RF signal.

20 Claims, 23 Drawing Sheets

(56) References Cited

U.S. PATENT DOCUMENTS

| | | | |
|---|---|---|---|
| 2010/0015967 A1* | 1/2010 | Perets | H04W 4/00 455/422.1 |
| 2010/0066442 A1* | 3/2010 | Mu | H03H 11/1291 327/553 |
| 2010/0149033 A1* | 6/2010 | Abraham | G01S 19/34 342/357.74 |
| 2012/0294299 A1 | 11/2012 | Fernando | |
| 2013/0121264 A1 | 5/2013 | Heo et al. | |
| 2014/0126401 A1 | 5/2014 | Motamed et al. | |
| 2014/0301339 A1 | 10/2014 | Sesia et al. | |

* cited by examiner

Intra-band aggregation contiguous Carriers

BAND A　　　BAND B

Intra-band aggregation non-contiguous Carriers

BAND A　　　BAND B

Inter-band Carrier aggregation

BAND A　　　BAND B

TRANSMITTER AND METHOD USING CARRIER AGGREGATION

PRIORITY

This application claims priority under 35 U.S.C. § 119(a) to Korean Application Ser. No. 10-2015-0054780, which was filed in the Korean Intellectual Property Office on Apr. 17, 2015 and to Korean Application Ser. No. 10-2015-0118853, which was filed in the Korean Intellectual Property Office on Aug. 24, 2015, the entire content of each of which is incorporated herein by reference.

BACKGROUND

1. Field of the Disclosure

The present disclosure generally relates to a wireless communication device and method, and more particularly, to an apparatus and a method for transmitting a signal by using intra-band non-contiguous uplink carrier aggregation.

2. Description of the Related Art

The Internet has evolved to the Internet of Things (IoT) network that exchanges information between distributed components such as objects in a human-oriented connection network in which humans generate and consume information. An Internet of Everything (IoE) technology in which big data processing technology through a connection with a cloud server is combined with the IoT technology has emerged. In order to implement the IoT, technical factors such as a sensing technique, wired/wireless communication, network infrastructure, service interface technology, and security technology are required, and thus technologies such as a sensor network, Machine to Machine (M2M), and Machine Type Communication (MTC) for a connection between objects have been recently researched. In an IoT environment, through the collection and analysis of data generated by connected objects, an intelligent Internet Technology (IT) service creates new value for human life. The IoT may be applied to fields such as a smart phone, smart building, smart city, smart car, connected car, smart grid, health care, smart home appliance, smart health care service, and the like through the convergence of the conventional Information Technologies (ITs) and various industries.

A terminal supporting the MTC, or M2M technology may perform wireless communication with an access point or a base station through a communication module.

The Long Term Evolution-Advanced (LTE-A) system supports Carrier Aggregation (CA) technology by gathering a plurality of different types of frequency carriers into one and transmitting a larger amount of data as well as Multiple-Input Multiple-Output (MIMO) technology. The CA technology corresponds to a technology of aggregating two or more Component Carriers (CCs). The CC may be one carrier frequency band.

A communication module (for example, a Radio Frequency Integrated Circuit (RFIC)) of the terminal supporting the CA technology may have the same structure regardless of inter-band CA and intra-band CA.

Accordingly, a communication module considering both inter-band CA and intra-band CA is needed. Particularly, an apparatus and a method for transmitting a signal through intra-band non-contiguous uplink carrier aggregation may be required.

According to various embodiments of the present disclosure, a communication device provides a communication apparatus and method according to inter-band CA and intra-band CA.

According to various embodiments of the present disclosure, the communication device provides an apparatus and a method for supporting intra-band non-contiguous uplink carrier aggregation.

According to various embodiments of the present disclosure, the communication device provides a circuit for supporting intra-band non-contiguous uplink carrier aggregation.

In accordance with an aspect of the present disclosure, a transmitter is provided. The transmitter includes a first communication unit for converting a first baseband signal into a first RF signal of a first band, a second communication unit for converting a second baseband signal into a second RF signal of a second band, a combiner for outputting a third RF signal by combining the first RF signal and the second RF signal, and an amplifier for amplifying the third RF signal.

In accordance with another aspect of the present disclosure, an operation method of a transmitter is provided. The operation method includes, converting a first baseband signal into a first RF signal of a first band, converting a second baseband signal into a second RF signal of a second band, outputting a third RF signal by combining the first RF signal and the second RF signal, and amplifying the third RF signal.

In accordance with another aspect of the present disclosure, an integrated circuit is provided. The integrated circuit includes, a first communication unit for converting a first baseband signal into a first RF signal of a first band, a second communication unit for converting a second baseband signal into a second RF signal of a second band, a combiner for outputting a third RF signal by combining the first RF signal and the second RF signal, and an amplifier for amplifying the third RF signal.

In accordance with another aspect of the present disclosure, an electronic device is provided. The electronic device includes at least two processors for generating a first baseband signal and a second baseband signal, a first communication unit for converting the first baseband signal into a first RF signal of a first band, a second communication unit for converting the second baseband signal into a second RF signal of a second band, a combiner for outputting a third RF signal by combining the first RF signal and the second RF signal, and an amplifier for amplifying the third RF signal.

In accordance with another aspect of the present disclosure, an operation method of an electronic device is provided. The operation method includes generating a first baseband signal and a second baseband signal, converting a first baseband signal into a first RF signal of a first band, converting a second baseband signal into a second RF signal of a second band, outputting a third RF signal by combining the first RF signal and the second RF signal, and amplifying the third RF signal.

In accordance with another aspect of the present disclosure, an IoT device is provided. The IoT device includes a sensor for detecting a signal, at least two processors for generating a first baseband signal and a second baseband signal based on the signal from the sensor, a first communication unit for converting the first baseband signal into a first RF signal of a first band, a second communication unit for converting the second baseband signal into a second RF signal of a second band, a combiner for outputting a third RF signal by combining the first RF signal and the second RF signal, and an amplifier for amplifying the third RF signal.

In accordance with another aspect of the present disclosure, an operation method of an IoT device is provided. The operation method includes detecting a signal by using a sensor, generating a first baseband signal and a second baseband signal based on the signal from the sensor, converting the first baseband signal into a first RF signal of a first band, converting the second baseband signal into a second RF signal of a second band, outputting a third RF signal by combining the first RF signal and the second RF signal, and amplifying the third RF signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
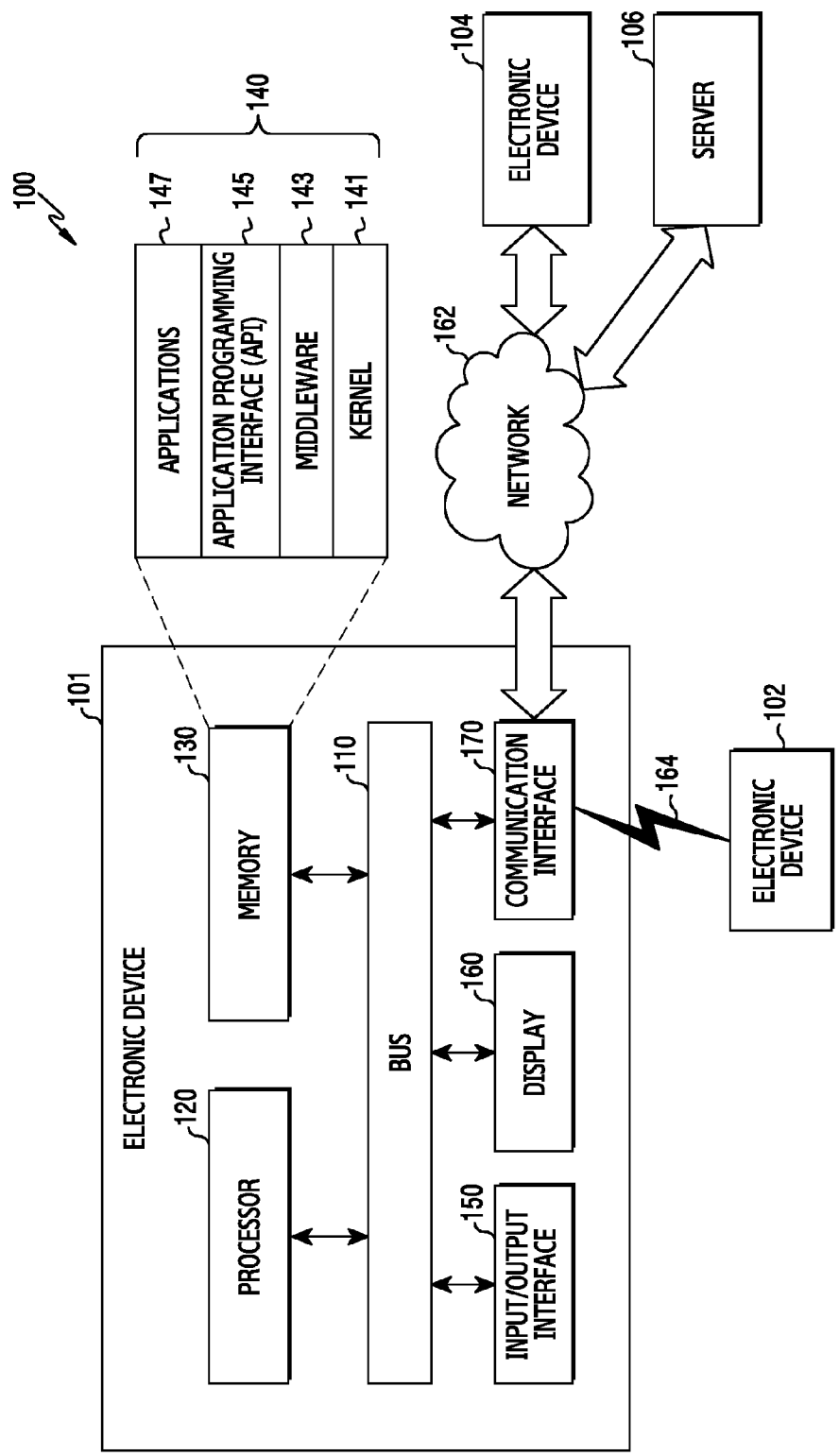
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In the description of the drawings, similar reference numerals may be used to designate similar elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be referred to as a second element, and similarly, a second element may be referred to as a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when it is mentioned that one element (e.g., a first element) is "directly coupled" or "directly connected" to another element (e.g., a second element), it may be construed that yet another element does not exist between the one element and the other element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in context. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to various embodiments of the present disclosure may include at least one of a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio (MP3) player, a mobile medical device, a camera, and a wearable device. According to various embodiments of the present disclosure, the wearable device may include at least one of an accessory type (e.g., a watch, a ring, a bracelet, an anklet, a necklace, glasses, contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. The home appliance may include at least one of a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an automatic teller machine (ATM) in banks, point of sales (POS) terminal in a shop, or an IoT device (e.g., a light bulb, various sensors, electric or gas meter, a sprinkler device, a fire alarm, a thermostat, a streetlamp, a toaster, sporting goods, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to an embodiment of the present disclosure may be a flexible device. Further, the electronic device according to an embodiment of the present disclosure is not limited to the aforementioned devices, and may include a new electronic device according to the development of new technologies.

The communication device of the present disclosure provides a communication apparatus and method according to inter-band CA and intra-band CA, to efficiently process a signal.

Further, the communication device may be implemented by independently controlling the gain of a plurality of output currents, and outputting currents after combining the gain-controlled output currents and amplifying the current through one power amplifier.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100 according to various embodiments will be described with reference to FIG. 1. The electronic device 101 includes a bus 110, a processor 120, a memory 130, an input/output interface 150, a display 160, and a communication interface 170. In an embodiment of the present disclosure, the electronic device 101 may omit at least one of the above components or further include other components.

The bus 110 may include, for example, a circuit which interconnects the elements 110 to 170 and delivers communication (for example, a control message and/or data) between the components 110 to 170.

The processor 120 may include one or more of a Central Processing Unit (CPU), an Application Processor (AP), and a Communication Processor (CP). The processor 120, for example, may carry out operations or data processing relating to control and/or communication of at least one other component of the electronic device 101.

The memory 130 may include a volatile memory and/or a non-volatile memory. The memory 130 may store, for example, commands or data related to at least one of the other components of the electronic device 101. According to an embodiment of the present disclosure, the memory 130 may store software and/or a program 140. The program 140 includes a kernel 141, middleware 143, an Application Programming Interface (API) 145, and/or an application program (or "applications") 147. At least some of the kernel 141, the middleware 143, and the API 145 may be referred to as an Operating System (OS).

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may serve as, for example, an intermediary for allowing the API 145 or the application programs 147 to communicate with the kernel 141 to exchange data.

Further, the middleware 143 may process one or more task requests received from the application programs 147 according to set task priorities. For example, the middleware 143 may assign priorities by which system resources (for example, the bus 110, the processor 120, the memory 130 and the like) of the electronic device 101 can be first used, to at least one of the application programs 147. For example, the middleware 143 may perform scheduling or load balancing on the one or more task requests by processing the one or more task requests according to the assigned priorities.

The API 145 is an interface by which the applications 147 control functions provided by the kernel 141 or the middleware 143, and may include, at least one interface or function (for example, commands) for file control, window control, image processing, or text control.

The input/output interface 150, for example, may function as an interface that may transfer instructions or data input from a user or another external device to the other component(s) of the electronic device 101. Furthermore, the input/output interface 150 may output the instructions or data received from the other component(s) of the electronic device 101 to the user or another external device. The input/output interface 150 may include an input device such as a touch panel or a data input device such as a camera module (or an image sensor module).

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display various pieces of content (for example, text, images, videos, icons, symbols, and the like) to the user. The display 160 may include a touch screen and receive a touch, gesture, proximity, or hovering input using an electronic pen or the user's body part.

The communication interface 170 may establish communication between the electronic device 101 and an external device (for example, a first external electronic device 102, a second external electronic device 104, or a server 106). The communication interface 170 may be connected to a network 162 through wireless or wired communication to communicate with the external devices (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. According to various embodiments of the present disclosure, the wireless communication may support Carrier Aggregation (CA) technology of aggregating and simultaneously using different frequency bands. Further, the wireless communication may include short-range communication 164. The short-range communication 164 may be performed by using at least one of, for example, Wi-Fi, Bluetooth, Near Field Communication (NFC), and Global Navigation Satellite System (GNSS). The GNSS may include at least one of a Global Positioning System (GPS), a Global navigation satellite system (Glonass), a Beidou navigation satellite system, and Galileo (European global satellite-based navigation system) according to a region for use. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (for example, a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed by the electronic device 101 may be performed by another electronic device or a plurality of electronic devices 102, 104 or server 106. According to an embodiment of the present disclosure, when the electronic device 101 performs some functions or services automatically or by request, the electronic device 101 may make a request for performing at least some functions related to the functions or services to another device 102, 104, or the server 106 instead of performing the functions or services by itself or additionally. Another electronic device 102, 104, or the server 106 may execute the requested functions or the additional functions, and may deliver a result of the execution to the electronic device 101. The electronic device 101 may process the received result as it is or additionally provide the requested functions or services. To achieve this function or service cloud computing, distributed computing, or client-server computing technology may be used.

Figure 2:
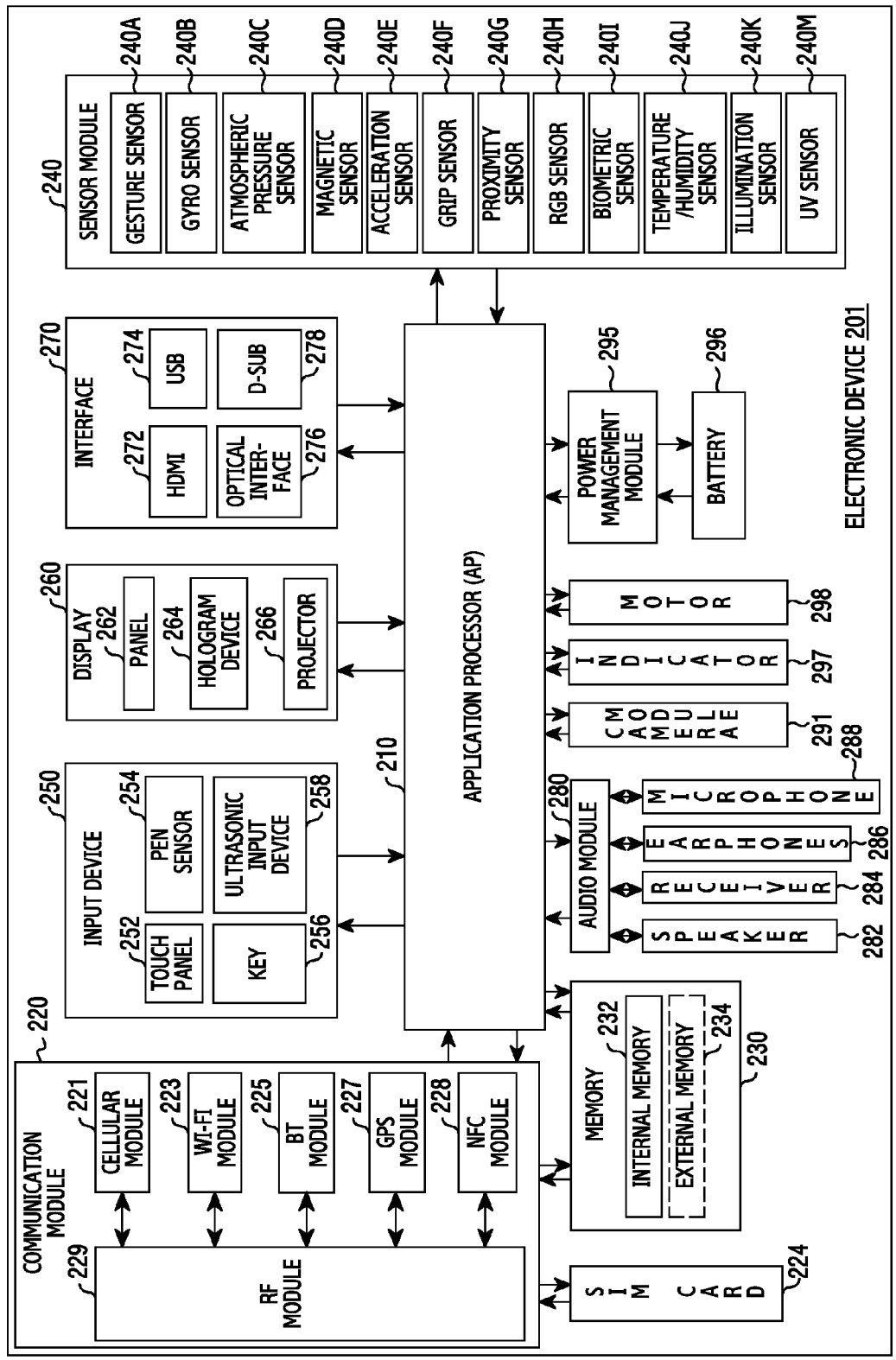
FIG. 2 is a block diagram of an electronic device according to various embodiments of the present disclosure.

FIG. 2 is a block diagram of an electronic device according to various embodiments of the present disclosure.

The electronic device 201 may include all or part of the electronic device 101 shown in FIG. 1. The electronic device 201 includes one or more Application Processors (APs) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by executing an operating system or an application program and perform processing of various pieces of data and calculations. The processor 210 may be implemented by, for example, a System on Chip (SoC). According to an embodiment of the present disclosure, the processor 210 may further include a Graphic Processing Unit (GPU) and/or an image signal processor. The processor 210 may include at least some of the components (for example, a cellular module 221) illustrated in FIG. 2. The processor 210 may load into a volatile memory, instructions or data received from at least one (for example, a non-volatile memory) of the other elements and may process the loaded instructions or data, and may store various data in a non-volatile memory.

The communication module 220 may have a configuration equal or similar to that of the communication interface 170 of FIG. 1. The communication module 220 includes the cellular module 221, a Wi-Fi module 223, a Bluetooth module 225, a GNSS module 227 (for example, a GPS module, a Glonass module, a Beidou module, or a Galileo module), an NFC module 228, and a Radio Frequency (RF) module 229.

The cellular module 221 may provide a voice call, an image call, a text message service, or an Internet service through a communication network. According to an embodiment of the present disclosure, the cellular module 221 may distinguish and authenticate the electronic device 201 within a communication network using a subscriber identification module (for example, a SIM card 224). According to an embodiment of the present disclosure, the cellular module 221 may perform at least some of the functions that the processor 210 may provide. According to an embodiment of the present disclosure, the cellular module 221 may include a communication processor (CP). According to various embodiments of the present disclosure, the cellular module 221 may support Carrier Aggregation (CA) technology of aggregating and simultaneously using different frequency bands.

Each of the Wi-Fi module 223, the BT module 225, the GPS module 227, and the NFC module 228 may include, for example, a processor for processing data transmitted/received through the corresponding module. According to some embodiments of the present disclosure, at least some (for example, two or more) of the cellular module 221, the Wi-Fi module 223, the BT module 225, the GNSS module 227, and the NFC module 228 may be included in one Integrated Chip (IC) or IC package.

The RF module 229 may transmit/receive a communication signal (for example, an RF signal). The RF module 229 may include, for example, a transceiver, a Power Amplifier Module (PAM), a frequency filter, a Low Noise Amplifier (LNA), and an antenna.

According to an embodiment of the present disclosure, the RF module 229 may convert a plurality of baseband signals into RF signals, combine the RF signals, amplify the combined RF signal, and transmit the amplified RF signal under control of the cellular module 221.

According to another embodiment of the present disclosure, the RF module 229 may convert a plurality of baseband signals into RF signals, amplify the RF signals through a plurality of power amplifiers, and simultaneously transmit the amplified RF signals.

According to another embodiment of the present disclosure, at least one of the cellular module 221, the Wi-Fi module 223, the BT module 225, the GPS module 227, and the NFC module 228 may transmit and receive RF signals through a separate RF module.

The subscriber identification module 224 may include an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM); an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, and the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 includes at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (for example, a red, green, blue (RGB) sensor), a biometric sensor (medical sensor) 240I, a temperature/humidity sensor 240J, an illuminance sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a fingerprint scan sensor. The sensor module 240 may further include a control circuit for controlling one or more sensors included therein. In an embodiment of the present disclosure, the electronic device 201 may further include a processor configured to control the sensor module 240 as a part of or separately from the processor 210, and may control the sensor module 240 while the processor 210 is in a sleep state.

The input device 250 includes a touch panel 252, a (digital) pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect ultrasonic waves generated by an input tool through a microphone 288 and identify data corresponding to the detected ultrasonic waves.

The display 260 includes a panel 262, a hologram device 264, or a projector 266. The panel 262 may include a configuration identical or similar to that of the display 160 illustrated in FIG. 1. The panel 262 may be implemented to be, for example, flexible, transparent, or wearable. The panel 262 may be formed as a single module together with the touch panel 252. The hologram device 264 may show a three dimensional image in the air by using an interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 includes a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert a sound and an electrical signal. At least some elements of the audio module 280 may be included in, for example, the input/output interface 150 illustrated in FIG. 1. The audio module 280 processes voice information input or output through a speaker 282, a receiver 284, earphones 286, or the microphone 288.

The camera module 291 is a device which may photograph a still image and a dynamic image. According to an embodiment of the present disclosure, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery 296 gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, and the like.) for wireless charging may be further included. The battery gauge may measure, for example, a charge quantity of the battery 296, and a voltage, a current, or a temperature while charging. The battery 296 may include, for example, a rechargeable battery or a solar battery.

The indicator 297 may display a particular state (for example, a booting state, a message state, a charging state, and the like) of the electronic device 201 or a part (for example, the processor 210) of the electronic device 201. The motor 298 may convert an electrical signal into mechanical vibration and may generate vibration, a haptic effect, and the like. Although not illustrated, the electronic device 201 may include a processing device (for example, a GPU) for supporting mobile TV. The processing unit for supporting mobile TV may, for example, process media data according to a certain standard such as Digital Multimedia Broadcasting (DMB), Digital Video Broadcasting (DVB), or MediaFLO™.

Each of the components of the electronic device according to an embodiment of the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Some of the hardware components according to various embodiments may be combined into one entity, which may perform functions identical to those of the relevant components before the combination.

Figure 3:
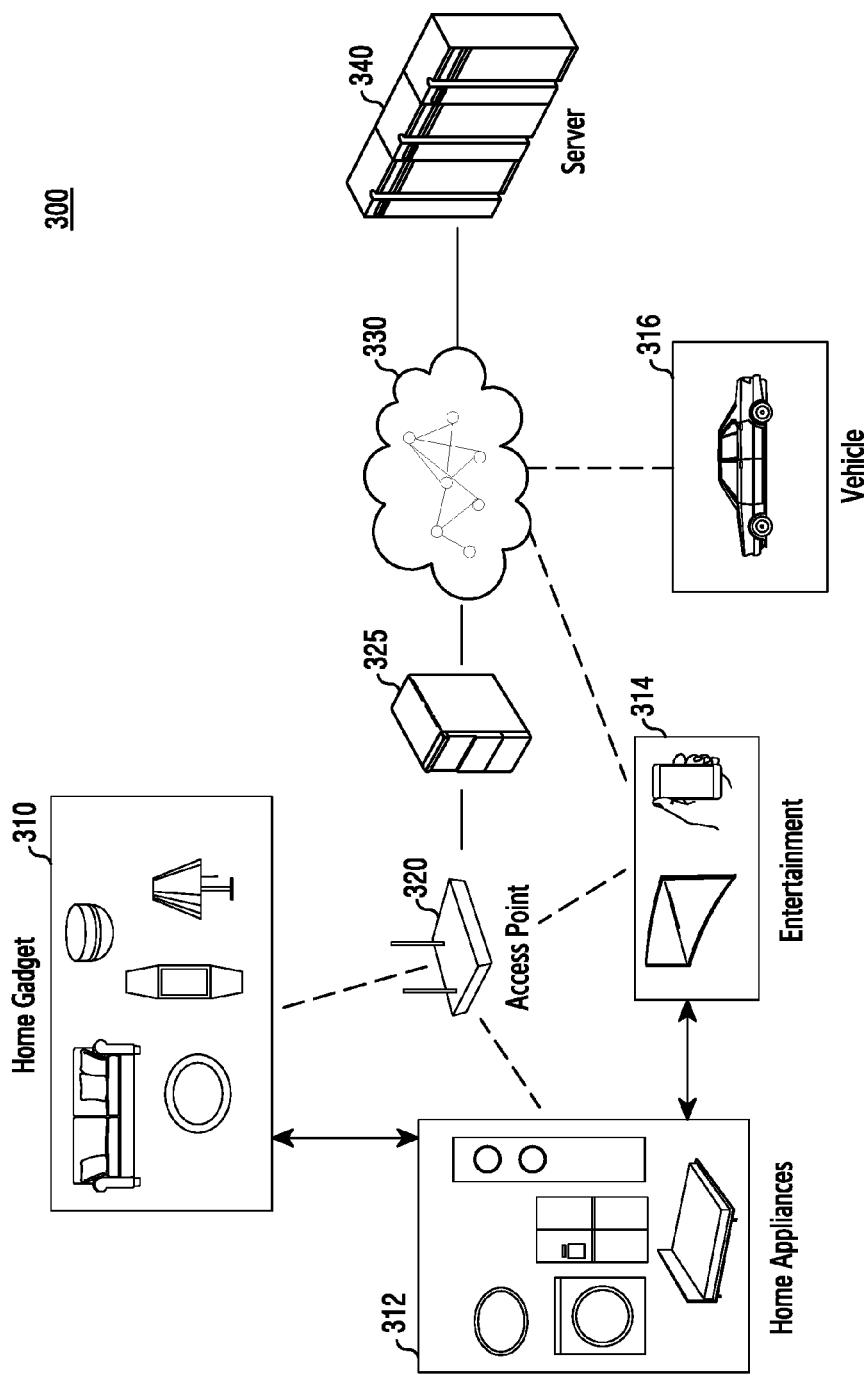
FIG. 3 is a diagram illustrating an IoT network system according to various embodiments of the present disclosure.

FIG. 3 illustrates an IoT network system according to various embodiments of the present disclosure. Referring to FIG. 3, the IoT network system 300 includes a plurality of IoT devices 310, 312, 314, and 316, an access point 320, a gateway 325, and a server 340. Further, the plurality of IoT devices 310, 312, 314, and 316 may be connected to a communication network 330 through the access point 320 and the gateway 325. According to various embodiments of the present disclosure, the plurality of IoT devices 310, 312, 314, and 316 may also be directly connected to the communication network 330 without passing through the access point 320 and the gateway 325. The IoT devices 310, 312, 314, and 316 may correspond to the electronic device 101 of FIG. 1 or the electronic device 201 of FIG. 2.

The term IoT may refer to a network connecting objects using wired/wireless communication. Accordingly, the term IoT used in the present disclosure may be used interchangeably with various terms such as an IoT network system, a Ubiquitous Sensor Network (USN) communication system, Machine Type Communications (MTC) system, a Machine Oriented Communication (MOC) system, a Machine to Machine (M2M) communication system, a Device to Device (D2D) communication system, and the like. The IoT network system may include an IoT device, an Access Point (AP), a gateway, a communication network, a server, and the like. However, such components are classified to describe the IoT network system, and do not limit the IoT network system. The IoT network system may use a transmission protocol such as a User Datagram Protocol (UDP) or a Transmission Control Protocol (TCP), an IPv6 Low-power Wireless Personal Area Networks (6LoWPAN) protocol, an IPv6 Internet routing protocol, or an application protocol such as a Constrained Application Protocol (CoAP), a Hypertext Transfer Protocol (HTTP), Message Queue Telemetry Transport (MQTT), or MQTT for sensors networks (MQTT-S) for information exchange (communication) between two or more components within the IoT network system.

Each of the plurality of IoT devices 310, 312, 314, and 316 within a Wireless Sensor Network (WSN) may be used as a sink node or a sensor node. The sink node may also be called a base station and serves as a gateway that connects the WSN and an external network the Internet. The sink node may assign a task to the sensor node and collect an event detected by each sensor node. The sensor node is a node within the WSN that may process and gather sensor information, and may be a node that may perform communication between nodes connected to each other within the WSN.

The plurality of IoT devices 310, 312, 314, and 316 may include an active IoT device, which operates using self-power, and a passive IoT device, which operates by power wirelessly applied externally. The active IoT device may include a refrigerator, air conditioner, telephone, car, and the like. The passive IoT device may include a Radio Frequency Identification (RFID) tag or an NFC tag.

According to another aspect of the present disclosure, the IoT devices 310, 312, 314, and 316 may include a passive communication interface such as a QR code, an RFID tag, an NFC tag, and the like, or may include an active communication interface such as a modem, a transceiver, and the like.

The IoT devices 310, 312, 314, and 316 may gather data by using a sensor or transmit the gathered data to the outside through a wired/wireless communication interface. Further, the IoT devices 310, 312, 314, and 316 may transmit and/or receive control information and/or data through the wired/wireless communication interface. The wired/wireless communication interface may be one of the accessible interfaces.

The IoT devices 310, 312, and 314 may be connected to a communication network through the access point 320 or connected to another IoT network. The access point 320 may be embedded in one IoT device. For example, the access point 320 may be embedded in a television or other electronic device. The user may monitor or control at least one IoT device connected to the access point 320 through a display. Further, the access point 320 may be included in one of the IoT devices. For example, a mobile phone may be both the IoT device and the access point 320 connected to another IoT device. The mobile phone may be connected to the communication network 330 through a mobile communication network or a short range wireless network.

The gateway 325 may change a communication protocol to allow the access point 320 to access an external communication network (for example, an Internet network or a public communication network). The IoT devices 310, 312, and 314 may be connected to the external communication network through the gateway 325. The gateway 325 may be integrated into the access point 320. The access point 320 may perform a function of a first gateway and the gateway 325 may perform a function of a second gateway.

The gateway 325 may be included in one of the IoT devices. For example, a mobile phone may be both the IoT device and the gateway 325 connected to another IoT device. The mobile phone may be connected to a mobile communication network.

The communication network 330 may include an Internet network and/or a public communication network. The public communication network may include a mobile communication network (a mobile cellular network). The communication network 330 may be a channel through which information gathered by the IoT devices 310, 312, 314, and 316 is transmitted. Preferably, the communication network 330 may be a backbone network that connects to the Internet.

The communication network 330 transmits data provided by the IoT devices 310, 31, 314, and 316 to the server 340. The server 340 may store or analyze the transmitted data. Further, the server 340 may transmit a result of the analysis through the communication network 330. The server 340 may store information related to at least one of the IoT devices 310, 312, 314, and 316 and analyze data transmitted from the relevant IoT device based on the stored information. Further, the server 340 may transmit the analysis result to the relevant IoT device or a user device through the communication network. For example, in a case of the IoT device that measures a blood sugar level of the user in real time, the server 340 may pre-store a blood sugar limit preset by the user and receive the measured blood sugar level through the communication network 330. The server 340 may transmit information informing of danger based on a comparison between the blood sugar limit and the transmitted blood sugar level to the user device and/or the relevant IoT device.

According to various embodiments of the present disclosure, each of the IoT devices 310, 312, 314, and 316 may form a group according to a characteristic of each IoT device. For example, the IoT devices may be grouped as a home gadget group 310, a home appliances/furniture group 312, an entertainment group 314, and a vehicle group 316. Further, the devices 310, 312, 314, and 316 may form a temperature control group that controls indoor temperature, a large home appliances group or a small home appliances group that is divided according to a degree of power consumption, a cleanliness group that controls indoor cleanliness (for example, air cleaning and floor cleaning), a lighting group that controls indoor lighting, the entertainment group 314 that controls an entertainment sound system (for example, a TV, an audio system, and the like). The temperature control group may include an air conditioner, an electric window, an electric curtain, and the like. For example, the home gadget group 310 may include a heartbeat sensor, a medical device for measuring blood sugar, a lighting device, a hygrometer, a monitor camera, a smart watch, a security keypad, a thermostat, a performing device, a window blind, and the like. The home appliances/furniture group 312 may include a robot cleaner, a washing machine, a refrigerator, an air conditioner, home appliances such as television, and furniture such as a bed with a sensor. The entertainment group 314 may include a multimedia image device and a communication device such as a television, a smart phone, and the like.

Each of the IoT devices may belong to a plurality of groups. For example, the air conditioner may belong to the large home appliances/furniture group 312 and the temperature control group, and the television may belong to the home appliances/furniture group 312 and the entertainment group 314. Further, the smart phone may belong to the home gadget group 310 and the entertainment group 314.

Figure 4:
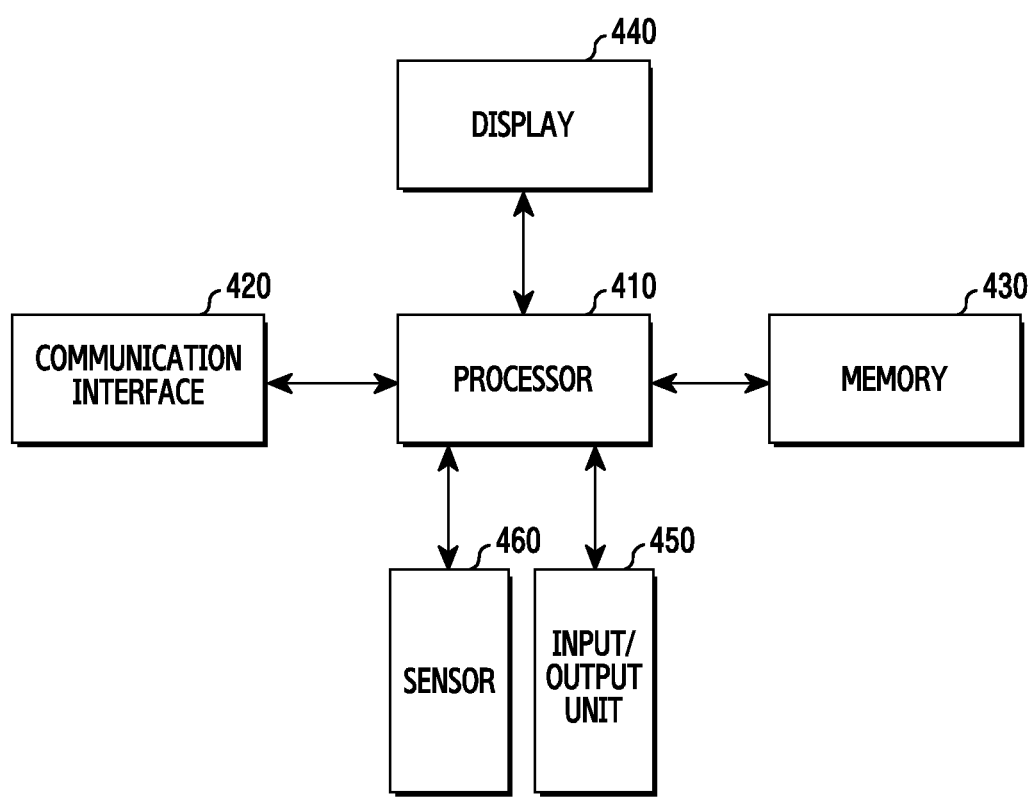
FIG. 4 illustrates a block diagram of an IoT device according to various embodiments of the present disclosure.

FIG. 4 is a block diagram illustrating a hardware structure of the IoT device described in FIG. 3 according to an embodiment of the present disclosure.

Referring to FIG. 4, an IoT device 400 includes a communication interface 420 for communicating with the outside. The communication interface 420 may be, for example, a wireless short range communication interface such as a Local Area Network (LAN), Bluetooth, Wi-Fi, or ZigBee or a modem communication interface which can access a mobile cellular network such as Power Line Communication (PLC), 3rd Generation (3G), Long Term Evolution (LTE), and the like.

A communication interface 420 may include a transmitter and/or a receiver. The IoT device 400 may transmit and/or receive information from the access point 320 or the gateway 325 through the transmitter and/or receiver. Further, the IoT device 400 may communicate with a user device or another IoT device to transmit and/or receive control information or data on the IoT device 400.

The IoT device 400 further includes a Processor 410 for performing calculations or an Application Processor (AP). The IoT device 400 may further include a power supply unit that includes a battery therein for internal power supply or receives power from an external source. Further, the IoT device 400 includes a display 440 for displaying an internal status or data. The user may control the IoT device 400 through a User Interface (UI) of the display 440 of the IoT device 400. The IoT device 400 may transmit the internal status and/or data through the transmitter and receive the control command and/or data through the receiver.

A memory 430 may store a control command code, control data, or user data for controlling the IoT device 400. The memory 430 may include at least one of a volatile memory and a non-volatile memory. The non-volatile memory may include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like. The volatile memory may include at least one of various memories such as a Dynamic RAM (DRAM), a Static RAM (SRAM), a Synchronous DRAM (SDRAM), a Phrase-change RAM (PRAM), a Magnetic RAM (MRAM), a Resistive RAM (RRAM), Ferroelectric RAM (FeRAM), and the like.

The IoT device 400 may further include a storage device. The storage device may be a non-volatile medium such as a hard disk (HDD), a Solid State Disk (SSD), an embedded Multi Media Card (eMMC), or a Universal Flash Storage (UFS). The storage device may store user's information provided through an input/output unit 450 and sensing information gathered through a sensor 460.

Figure 5:
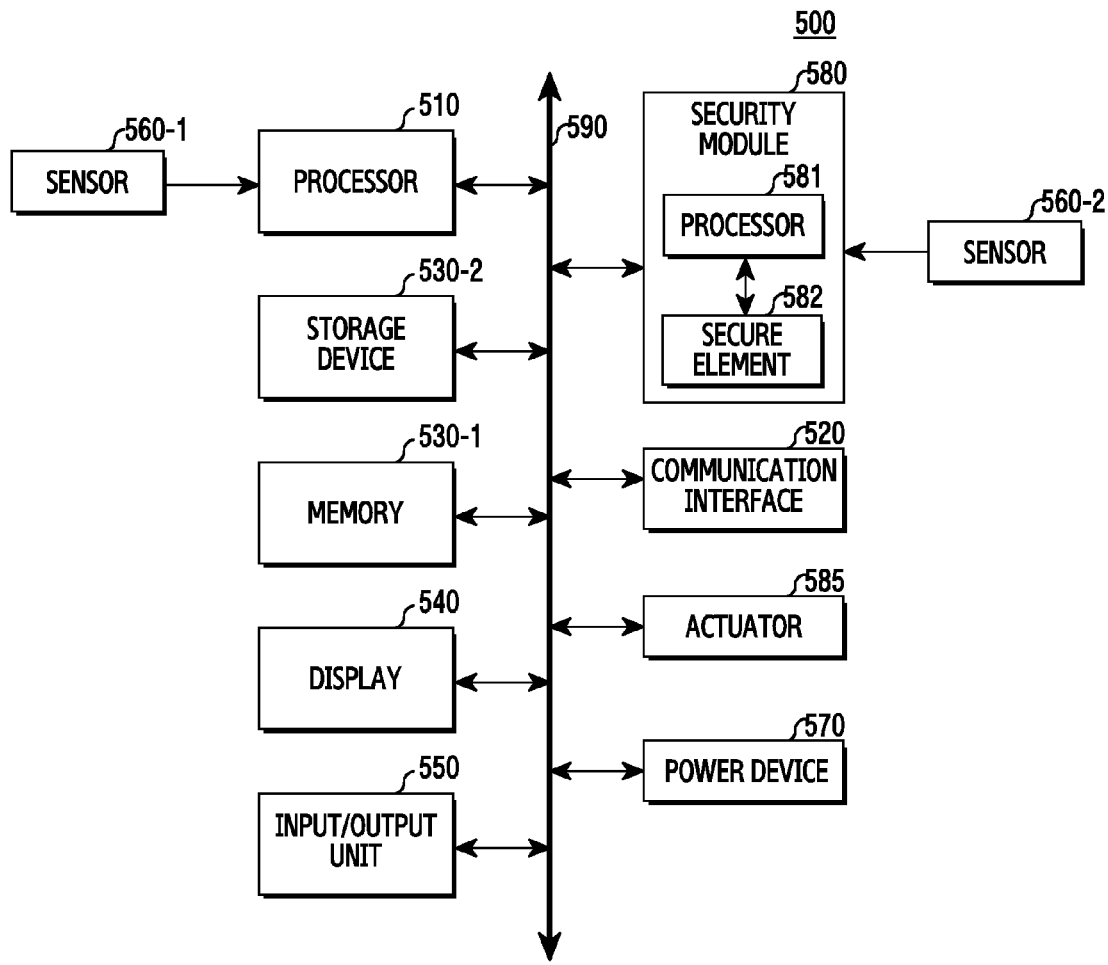
FIG. 5 illustrates a block diagram of an IoT device according to other various embodiments of the present disclosure.

FIG. 5 is a block diagram illustrating a hardware structure of the IoT device described in FIG. 3 according to another embodiment of the present disclosure.

A module or a secure element in the present disclosure may refer to hardware (or a hardware component) which may perform a function and/or operation corresponding to each name to be described in the present disclosure, software (or a software component) which may perform a particular function and/or operation, or an electronic recording medium (for example, a processor or CPU) including a computer program code which may perform a particular function and/or operation, but is not limited thereto. In other words, the module or the secure element may refer to a functional and/or structural combination of hardware for performing the embodiments of the present disclosure or software for driving the hardware.

Referring to FIG. 5, an IoT device 500 includes an application processor 510, a communication interface 520, a security module 580, a storage device 530-2, a memory 530-1, a display 540, an input/output device 550, a data bus 590, a power device 570, an actuator 585, and/or one or more sensors 560-1 and 560-2.

The application processor 510 may control the general operation of the IoT device 500. The application processor 510 may execute applications that provide an Internet browser, a game, a dynamic image, and the like. According to an embodiment of the present disclosure, the application processor 510 may include a single processor core or a multi-processor core. For example, the application processor 510 may include a multi-core such as a dual-core, a quad-core, a hexa-core, and the like. Further, according to an embodiment of the present disclosure, the application processor 510 may further include a cache memory located internally or externally to the application processor 510.

The security module 580 may also include a processor 581 and a secure element 582. The security module 580 including the processor 581 and the secure element 582 may be formed as one package, and an internal bus (INT_BUS) connecting the processor 581 and the secure element 582 may be formed inside the package. The secure element 582 may include a function for preventing a security attack from the outside. Accordingly, the secure element 582 may be used for safely storing security data. The processor 581 in the security module 580 may be connected to the application processor 510.

The sensor 560-1 may be, for example, an image sensor for sensing an image. The sensor 560-1 may be connected to the application processor 510 to transmit generated image information to the application processor 510. The sensor 560-2 may be a bio sensor for sensing biometric information. For example, the sensor 560-2 may detect a fingerprint, an iris pattern, a blood vessel pattern, a heartrate, blood sugar level, and the like, generate sensing data corresponding to the detected information, and provide the sensing data to the processor 581 included in the security module 580. However, the sensor 560-2 is not limited to a bio sensor and may be a predetermined sensor such as an illuminance sensor, a sound sensor, an acceleration sensor, and the like.

The security module 580 may include the secure element 582. The security module 580 and the application processor 510 may generate a session key through mutual authentication. For example, the application processor 510 and the secure element 582 may perform the mutual authentication by using a first authentication certificate stored in the secure element 582, a second authentication certificate stored in the application processor 510, and a public key of a certificate authority stored in the application processor 510 and the secure element 582 in common. When the mutual authentication is successful based on the result of the authentication, the secure element 582 may generate the session key by using a first private key stored in the secure element 582 and a second private key stored in the application processor 510. Thereafter, the security module 580 may encrypt sensing data by using the session key and transmit the encrypted sensing data to the application processor 510. The application processor 510 may decrypt the encrypted sensing data by using the session key to acquire the sensing data. Accordingly, it is possible to improve the security level of data transmission in the IoT device 500. The secure element 582 may also be formed as one package together with the application processor 510.

The security module 580 may further include the processor 581. The processor 581 may encrypt sensing data input from the sensor 560-2 and control communication between the application processor 510 and the secure element 582. The secure element 582 may be formed as one package together with the processor 581.

The storage device 530-2 may store a boot image for booting the IoT device 500. For example, the storage device 530-2 may include a non-volatile memory device such as a flash memory device, a Solid State Drive (SSD), and the like.

The memory 530-1 may store data required for the operation of the IoT device 500. For example, the memory 530-1 may include a non-volatile memory device such as a Dynamic Random Access Memory (DRAM), a Static Random Access Memory (SRAM), and the like.

The input/output unit 550 may include an input means such as a touch pad, a keypad, an input button, and the like, and an output means such as a display, a speaker, and the like. The power device 570 may supply an operation voltage required for the operation of the IoT device 500. The power device 570 may include a power supply and/or a battery. The actuator 585 may include various components required for physically driving the IoT device 500. For example, the actuator 585 may include a motor driving circuit and a motor.

Figure 6:
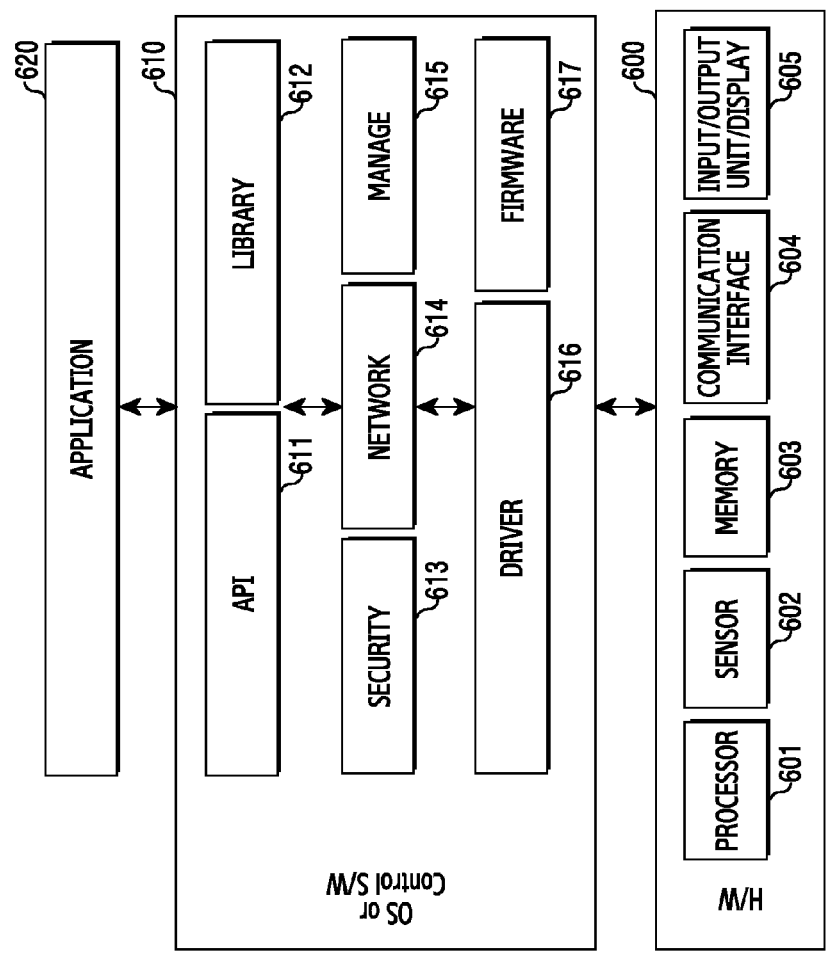
FIG. 6 is a diagram illustrating the structure of hardware (HW) and software (SW) components of the IoT device according to various embodiments of the present disclosure.
Figure 6:
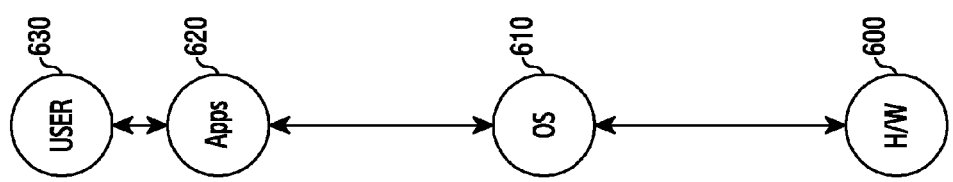

FIG. 6 is a conceptual diagram illustrating structures of hardware (HW) and software (SW) of the IoT devices 400 and 500 described in FIGS. 4 and 5 according to an embodiment of the present disclosure. Referring to FIG. 6, IoT hardware 600 includes various components of the IoT devices 400 and 500 described in FIGS. 4 and 5. The IoT hardware 600 includes an Application Processor (AP) 601, a sensor 602, a memory 603, a communication interface 604, and an input/output unit/display 605. For example, the AP 601, the sensor 602, the memory 603, the communication interface 604, and the input/output unit/display 605 of FIG. 6 may correspond to the AP 410, the sensor 460, the memory 430, the communication interface 420, and the input/output unit 450 of FIG. 4, respectively.

The IoT devices 400 and 500 may further include an OS 610 and/or an application 620. Referring to FIG. 6, FIG. 6 illustrates an operation between layers such as the hardware 600, the OS 610, the application 620, and the user 630.

The application 620 refers to software and a service for implementing a particular function. The user 630 refers to an entity using the application 620. The user 630 may communicate with the application 620 through a User Interface (UI). The application 620 may be manufactured based on the service provided to the user 630 through the user interface that is fit for the purpose. The application 620 may perform an operation requested by the user 630, but may call the content of an Application Protocol Interface (API) 611 and a library 612 if necessary.

The API 611 and/or the library 612 may perform a macro operation for performing a particular function or provide an interface if communication with a lower layer is needed. When the application 620 makes a request for an operation to a lower layer through the API 611 and/or the library 612, the API 611 and/or the library 612 may classify the received request into security 613, network 614 and management 615. The API 611 and/or the library 612 may operate a required layer according to a request. For example, when the API 611 makes a request for a function related to the network 614, the AP 611 may transmit a parameter required for the network 614 and call a related function. At this time, the network 614 may communicate with the lower layer to perform the requested task. When there is no lower layer, the API 611 and/or the library 612 may directly perform the corresponding task.

A driver 616 may serve to receive the requests from the higher layers and transfer the requests to the hardware 600 while managing the hardware 600 and checking its status.

When the driver 616 makes a request for a task to the hardware 600, firmware 617 may change the corresponding request so that the hardware 600 can accept the request. The firmware 617 that changes the request and transfers the request to the hardware 600 may be included in the driver 616 or in the hardware 600.

The IoT devices 400 and 500 may include the OS 610 that includes the API 611, the driver 616, and the firmware 617 to manage all of them. The OS 610 may be stored in the memory 430 in the form of a control command code and data. A low cost IoT device having a simple function may include control software 610 rather than the OS due to a small memory.

The hardware 600 may process in-order or out-of-order requests (or commands) transferred by the driver 616 and the firmware 617, and store a result thereof in a register within the hardware 600 or the memory 430 connected to the hardware 600. The stored result may be returned to the driver 616 and the firmware 617.

The hardware 600 may generate an interrupt to make a request for the operation required for a higher layer. When the interrupt is generated, the hardware 600 identifies the corresponding interrupt in a part of the management 615 of the OS 610 and then communicates with a part of the hardware 600 to process the corresponding interrupt. For example, when a character "R" is input into a keyboard corresponding to one of peripherals, the input is considered as the interrupt. The corresponding interrupt may be transferred to the management 615 of the OS 610 or directly transferred to the hardware 600, and the hardware 600 may output a value "R" on the display 440 of FIG. 4.

Various embodiments of the present disclosure relate to a transmitter and method for processing a signal by using intra-band non-contiguous uplink carrier aggregation.

The transmitter may correspond to a function block for performing some or all of the functions of the communication interface 170 of FIG. 1, the RF module 229 of FIG. 2, the communication interface 420 of FIG. 4, and the communication interface 520 of FIG. 5. Further, the transmitter may be implemented by a Radio Frequency Integrated Circuit (RFIC).

Hereinafter, uplink carrier aggregation may be used to describe data transmission to the base station through the CA technology by the terminal. Further, the downlink carrier aggregation may be used to describe data transmission to the terminal through the CA technology by the base station.

Figure 7:
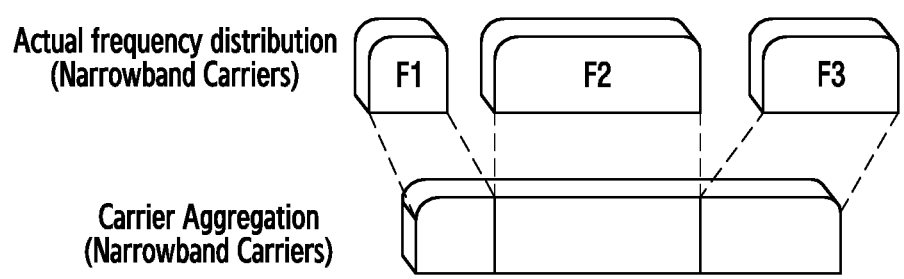
FIG. 7 is a diagram illustrating Carrier Aggregation (CA) according to various embodiments of the present disclosure.

FIG. 7 is a conceptual diagram illustrating Carrier Aggregation (CA) according to various embodiments of the present disclosure.

The 3GPP LTE Release 10 standard adopts the CA technology which can increase a transmission rate by aggregating two or more different bands and integrally managing the bands as one virtual broadband. Each band adopted by the CA is referred to as a Component Carrier (CC).

Referring to FIG. 7, carriers F1, F2, and F3 may be aggregated into one virtual broadband carrier. Each of F1, F2, and F3 may be one CC.

A bandwidth corresponding to F1, a bandwidth corresponding to F2, and a bandwidth corresponding to F3 may be contiguous to each other or non-contiguous. Further, a bandwidth corresponding to F1, a bandwidth corresponding to F2, and a bandwidth corresponding to F3 may have the same sized bandwidth or different sized bandwidths.

For example, 10 MHz corresponding to the carrier F1, 10 MHz corresponding to the carrier F2, and 10 MHz corresponding to the carrier F3 may be aggregated and serviced in one bandwidth of 30 MHz. Alternatively, 10 MHz corresponding to the carrier F1, 10 MHz corresponding to the carrier F2, and 20 MHz corresponding to the carrier F3 may be aggregated and serviced in one bandwidth of 40 MHz.

Figure 8A:
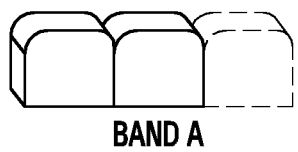
FIGS. 8A to 8C are diagrams illustrating types of CA according to various embodiments of the present disclosure.
Figure 8A:
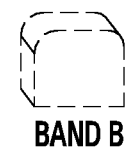
Figure 8B:
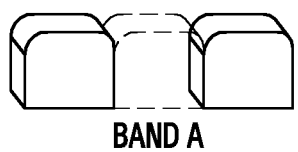
Figure 8B:
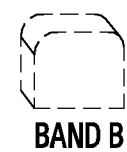
Figure 8C:
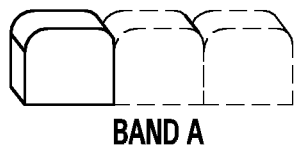
Figure 8C:
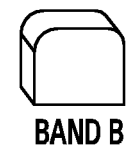

FIGS. 8A to 8C illustrate types of CA according to various embodiments of the present disclosure.

FIG. 8A illustrates intra-band contiguous carrier aggregation. The intra-band contiguous carrier aggregation aggregates contiguous Component Carriers (CCs) within the same band. For example, when there are three CCs within band A, any two contiguous CCs may be aggregated.

FIG. 8B illustrates intra-band non-contiguous carrier aggregation. The intra-band non-contiguous carrier aggregation aggregates non-contiguous Component Carriers (CCs) within the same band. For example, when there are three CCs within band A, two non-contiguous CCs may be aggregated.

In FIG. 8C, inter-band carrier aggregation aggregates CCs existing in different bands. For example, when there are three CCs within band A and one CC within band B, one CC within band A and one CC within band B may be aggregated. As another example, multiple non-contiguous CCs within band A may be aggregated with one CC within band B, FIG. 9 illustrates a transmitter that supports CA using two CCs according to various embodiments of the present disclosure.

Figure 9:
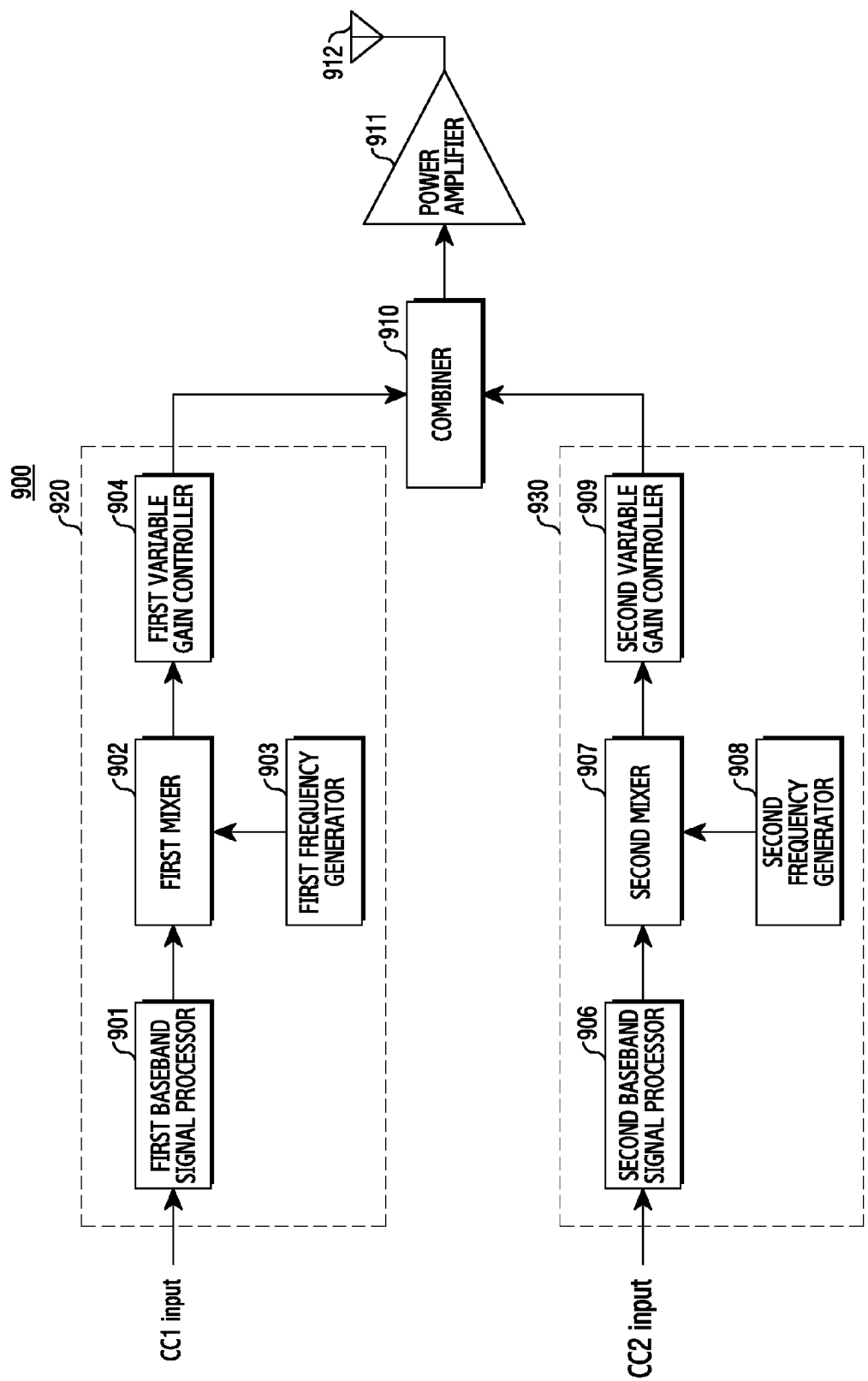
FIG. 9 illustrates a block diagram of a transmitter that supports CA using two Component Carriers (CCs) according to various embodiments of the present disclosure.

Referring to FIG. 9, a transmitter 900 includes a first communication unit 920 including a first baseband signal processor 901, a first mixer 902, a first frequency generator 903, and a first variable gain controller 904, a second communication unit 930 including a second baseband signal processor 906, a second mixer 907, a second frequency generator 908, and a second variable gain controller 909, a combiner 910, and a power amplifier 911.

The first baseband signal processor 901 and the second baseband signal processor 906 may be a module corresponding to the cellular module 221 of FIG. 2, and the first mixer 902, the first frequency generator 903, the first variable gain controller 904, the second mixer 907, the second frequency generator 908, the second variable gain controller 909, and the combiner 910 may be a module corresponding to the RF module 229 of FIG. 2. For example, the first mixer 902, the first frequency generator 903, the first variable gain controller 904, the second mixer 907, the second frequency generator 908, the second variable gain controller 909, and the combiner 910 may be implemented in one or multiple RFICs or RFIC packages.

The first communication unit 920 may convert a first baseband signal into an RF signal corresponding to a first CC and output the converted RF signal to the combiner 910.

The second communication unit 930 may convert a second baseband signal into an RF signal corresponding to a second CC and output the converted RF signal to the combiner 910.

The first baseband signal processor 901 and the second baseband signal processor 906 may process the first baseband signal and the second baseband signal according to corresponding communication schemes and output the processed signals to the first mixer 902 and the second mixer 907, respectively. For example, in a Code Division Multiple Access (CDMA) communication scheme, the baseband signal processors 901 and 906 may perform functions of channel-coding and spreading data to be transmitted. According to various embodiments of the present disclosure, in a Single Carrier Frequency Division Multiple Access (SC-FDMA) communication scheme, the baseband signal processors 901 and 906 may perform a Discrete Fourier Transform (DFT) operation and an Inverse Fast Fourier Transform (IFFT) operation on data to be transmitted.

The first baseband signal is transmitted through the first CC and may be output to the first mixer 902, and the second baseband signal is transmitted through the second CC and may be output to the second mixer 907.

Further, the first baseband signal and the second baseband signal may be divided in to an In-phase (I) component and a Quadrature (Q) component and output to the first mixer 902 and the second mixer 907, respectively.

The first mixer 902 and the second mixer 907 may mix two different frequencies (that is, a frequency of a baseband signal from the first baseband signal processor 901 and a first Local Oscillation (LO) frequency from the first frequency generator 903, or a frequency of a baseband signal from the second baseband signal processor 906 and a second LO frequency from the second frequency generator 908) and make the combined frequency transition to another frequency. That is, the first mixer 902 may convert the first baseband signal into a first RF signal, and the second mixer 907 may convert the second baseband signal into a second RF signal.

For example, the frequency of the baseband signal may transition to at least one of a first output frequency generated by adding the LO frequency and the frequency of the baseband signal, a second output frequency generated by subtracting the frequency of the baseband signal from the LO frequency, and the LO frequency. Output signals of the first mixer 902 and the second mixer 907 may be referred to as the first RF signal and the second RF signal, respectively.

The first mixer 902 and the second mixer 907 may be implemented by a balanced mixer or an unbalanced mixer. The unbalanced mixer may be classified into a single FET frequency mixer (a gate mixer or a drain mixer), a dual gate frequency mixer, and a cascade frequency mixer. However, various embodiments of the present disclosure are not limited to a particular frequency mixer.

The first frequency generator 903 and the second frequency generator 908 generate the first local oscillation frequency and the second local oscillation frequency and output the generated frequencies to the first mixer 902 and the second mixer 907, respectively. Preferably, the first frequency generator 903 and the second frequency generator 908 may generate the first local oscillation frequency and the second local oscillation frequency, respectively, according to a control voltage of a Phase Locked Loop (PLL) which is not shown.

The first variable gain controller 904 and the second variable gain controller 909 may control gains to uniformly maintain power of the first RF signal and the second RF signal according to control signals thereof. For example, the first variable gain controller 904 and the second variable gain controller 909 may reduce the gains when output levels of the first RF signal and the second RF signal are high, and increase the gains when output levels of the first RF signal and the second RF signal are low.

The combiner 910 may combine the first RF signal and the second RF signal of which the gains have been controlled by the first variable gain controller 904 and the second variable gain controller 909 respectively. Since the first CC and the second CC have different frequency bands, the first RF signal and the second RF signal may be distinguished in a frequency domain, but the first RF signal and the second RF signal may be combined into a third RF signal physically in a time domain. In an embodiment of the present disclosure, the combiner 910 may be configured by a wired connection that combines outputs of the first variable gain controller 904 and the second variable gain controller 909 and outputs the combined output according to commands through a command port.

The power amplifier 911 may amplify the third RF signal from the combiner 910 and output the amplified third RF signal through an antenna 912.

In FIG. 9, the first CC and the second CC may be the intra-band contiguous carriers as illustrated in FIG. 8A or may be the intra-band non-contiguous carriers as illustrated in FIG. 8B.

The path through which the first RF signal is generated through the first baseband signal processor 901, the first mixer 902, the first frequency generator 903, and the first variable gain controller 904, is referred to as a first RF path or chain, and the path through which the second RF signal is generated through the second baseband signal processor 906, the second mixer 907, the second frequency generator 908, and the second variable gain controller 909, is referred to as a second RF path or chain.

FIGS. 10A to 10D illustrate graphs of spectra of a signal processing step in a transmitter according to various embodiments of the present disclosure.

Figure 10B:
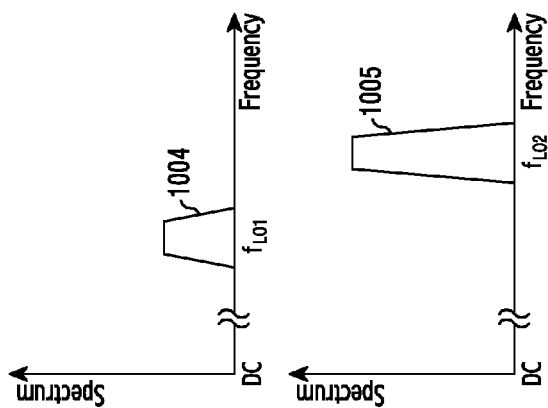
FIGS. 10A to 10D illustrate graphs of spectra of a signal processing step in a transmitter according to various embodiments of the present disclosure.
Figure 10C:
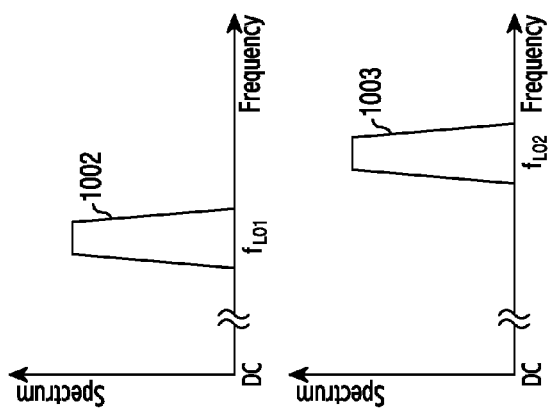
Figure 10A:
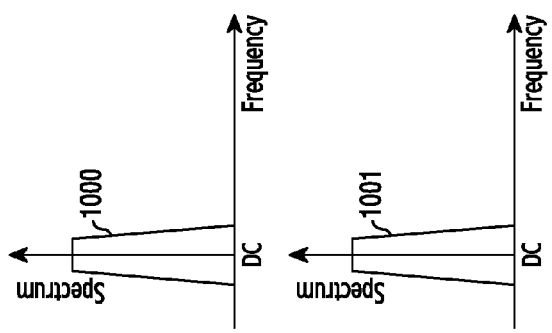

FIG. 10A illustrates spectra 1000 and 1001 of the first baseband signal and the second baseband signal, respectively, of FIG. 9.

FIG. 10B illustrates a spectrum 1002 when the first baseband signal of FIG. 9 is combined with a first local oscillation frequency $f_{LO1}$ and a spectrum 1003 when the second baseband signal is combined with a second local oscillation frequency $f_{LO2}$. The first local oscillation frequency $k_{LO1}$ may be lower than the second local oscillation frequency $f_{LO2}$.

FIG. 10C illustrates a spectrum 1004 after the first baseband signal of which the frequency is converted, that is, the first RF signal of FIG. 9 is gain-controlled, and a spectrum 1005 after the second baseband signal of which the frequency is converted, that is, the second RF signal is gain-controlled. Here, the gain of the first RF signal is reduced since the output level of the first RF signal is high, and a change in the gain of the second RF signal may be small since the output level of the second RF signal is slightly changed.

Figure 10D:
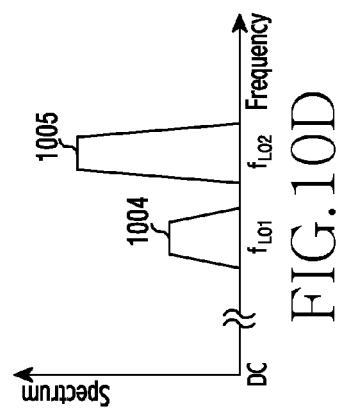

FIG. 10D illustrates a spectrum of the third RF signal generated by adding the first RF signal and the second RF signal of FIG. 9. Referring to FIG. 10D, the first RF signal of which the gain is controlled and the second RF signal of which the gain is controlled may be distinguished in the frequency domain.

Figure 11:
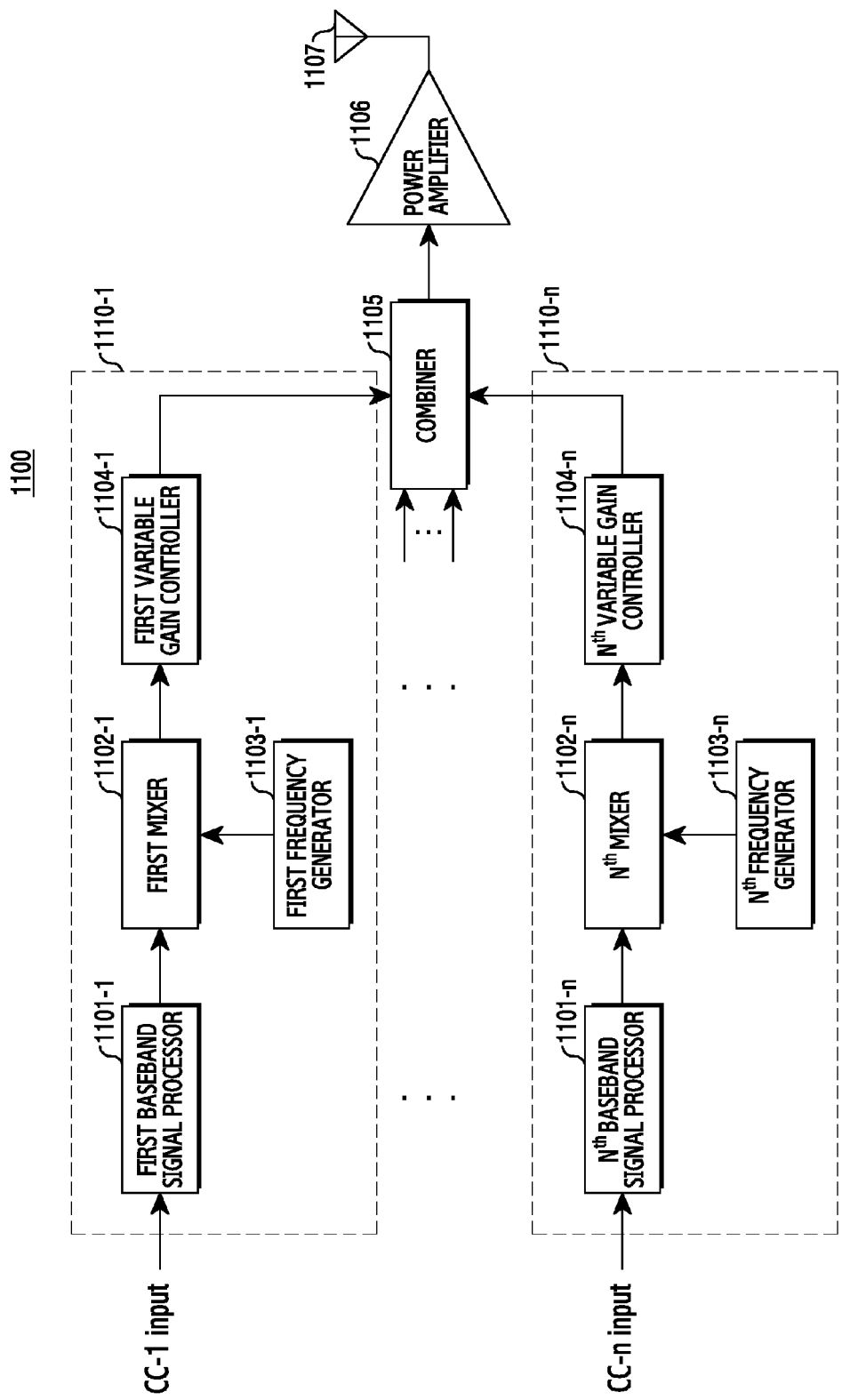
FIG. 11 illustrates a transmitter that supports CA using a plurality of CCs according to various embodiments of the present disclosure.

FIG. 11 illustrates a transmitter that supports CA using a plurality of CCs according to various embodiments of the present disclosure.

Referring to FIG. 11, the transmitter 1100 may include a plurality of communication units 1110_1 to 1110_n, a combiner 1105, a power amplifier 1106 and an antenna 1107. The plurality of communication units 1110_1 to 1110_n may include a plurality of baseband signal processors 1101_1 to 1101_n, a plurality of mixers 1102_1 to 1102_n, a plurality of frequency generators 1103_1 to 1103_n, and a plurality of variable gain controllers 1104_1 to 1104_n.

The plurality of baseband signal processors 1101_1 to 1101_n may be a module corresponding to the cellular module 221 of FIG. 2, and the plurality of mixers 1102_1 to 1102_n, the plurality of frequency generators 1103_1 to 1103_n, and the plurality of variable gain controllers 1104_1 to 1104_n may be a module corresponding to the RF module 229 of FIG. 2. For example, the plurality of mixers 1102_1 to 1102_n, the plurality of frequency generators 1103_1 to 1103_n, the plurality of variable gain controllers 1104_1 to 1104_n, and the combiner 1105 may be implemented by one or multiple RFICs or RFIC packages.

The plurality of baseband signal processors 1101_1 to 1101_n may perform the same function as that of the first baseband signal processor 901 and the second baseband signal processor 906.

The plurality of mixers 1102_1 to 1102_n may perform the same function as that of the first mixer 902 and the second mixer 907.

The plurality of frequency generators 1103_1 to 1103_n may perform the same function as that of the first frequency generator 903 and the second frequency generator 908.

The plurality of variable gain controllers 1104_1 to 1104_n may perform the same function as that of the first variable gain controller 904 and the second variable gain controller 909.

The combiner 1105 may output one RF signal by adding a first RF signal to an $n^{th}$ RF signal of which gains have been controlled by the plurality of variable gain controllers 1104_1 to 1104_n. The combiner 1105 may combine up to n RF signals. Since the first CC and the $n^{th}$ CC have different frequency bands, the first RF signal and the $n^{th}$ RF signal may be distinguished in the frequency domain, but the first RF signal to the $n^{th}$ RF signal may be combined into one RF signal physically in the time domain.

The power amplifier 1106 may amplify the one RF signal generated by combining the plurality of RF signals from the combiner 1105 and output the amplified RF signal through the antenna 1107.

In FIG. 11, the first CC and the $n^{th}$ CC may be the intra-band contiguous carriers as illustrated in FIG. 8A or may be the intra-band non-contiguous carriers as illustrated in FIG. 8B.

Figure 12:
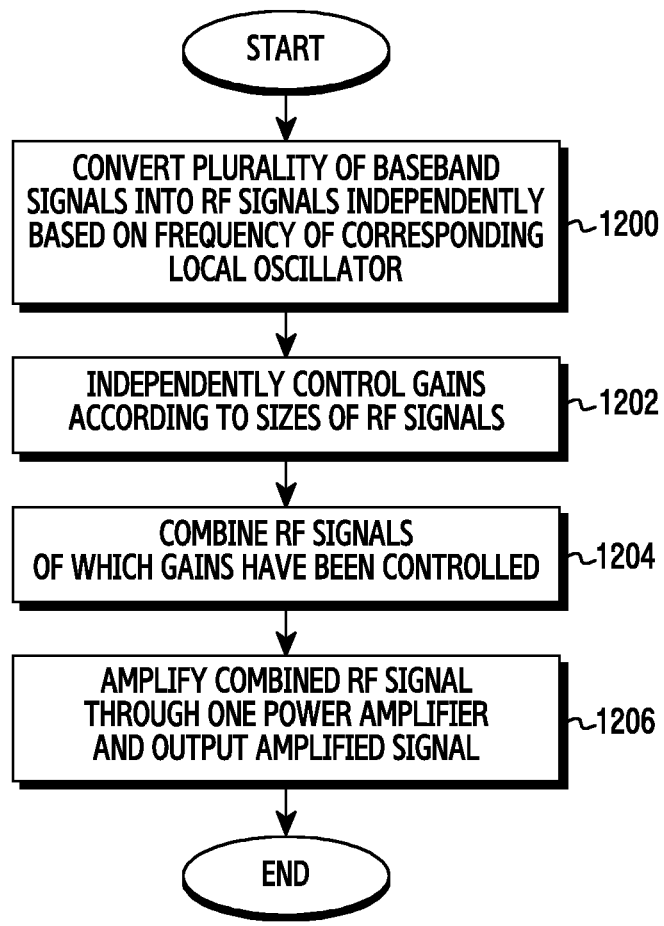
FIG. 12 is a flowchart illustrating an operation of a transmitter according to various embodiments of the present disclosure.

FIG. 12 is a flowchart illustrating an operation of the transmitter according to various embodiments of the present disclosure.

Referring to FIG. 12, the plurality of mixers 1102_1 to 1102_n converts baseband signals into RF signals independently based on corresponding local oscillation frequencies, respectively, in step 1200. For example, the first mixer 1102_1 may mix the frequency of the baseband signal from the first baseband signal processor 1101_1 and the first local oscillation frequency (LO) from the first frequency generator 1103_1 and generate the mixed frequency RF signal. Similarly, the $n^{th}$ mixer 1102_n may mix the frequency of the baseband signal from the $n^{th}$ baseband signal processor 1101_n and the $n^{th}$ local oscillation frequency (LO) from the $n^{th}$ frequency generator 1103_n and generate the mixed frequency RF signal.

The plurality of variable gain controllers 1104_1 to 1104_n independently controls the gain of each mixed RF signal to uniformly maintain power of the first RF signal to the $n^{th}$ RF signal according to control signals thereof, respectively, in step 1202. For example, the first variable gain controller 1104_1 may reduce the gain when the output level of the first RF signal is high and increase the gain when the output level of the first RF signal is low. Similarly, the $n^{th}$ variable gain controller 1104_n may reduce the gain when the output level of the $n^{th}$ RF signal is high and increase the gain when the output level of the $n^{th}$ RF is low.

The combiner 1105 combines the first RF signal to the $n^{th}$ RF signal of which the gains have been controlled by the plurality of variable gain controllers 1104_1 to 1104_n in step 1204. Since the first CC and the $n^{th}$ CC have different frequency bands, the first RF signal and the $n^{th}$ RF signal may be distinguished in the frequency domain, but the first RF signal to the $n^{th}$ RF signal may be combined into one RF signal physically in the time domain.

The power amplifier 1106 amplifies and outputs the combined RF signal in step 1206.

Figure 13:
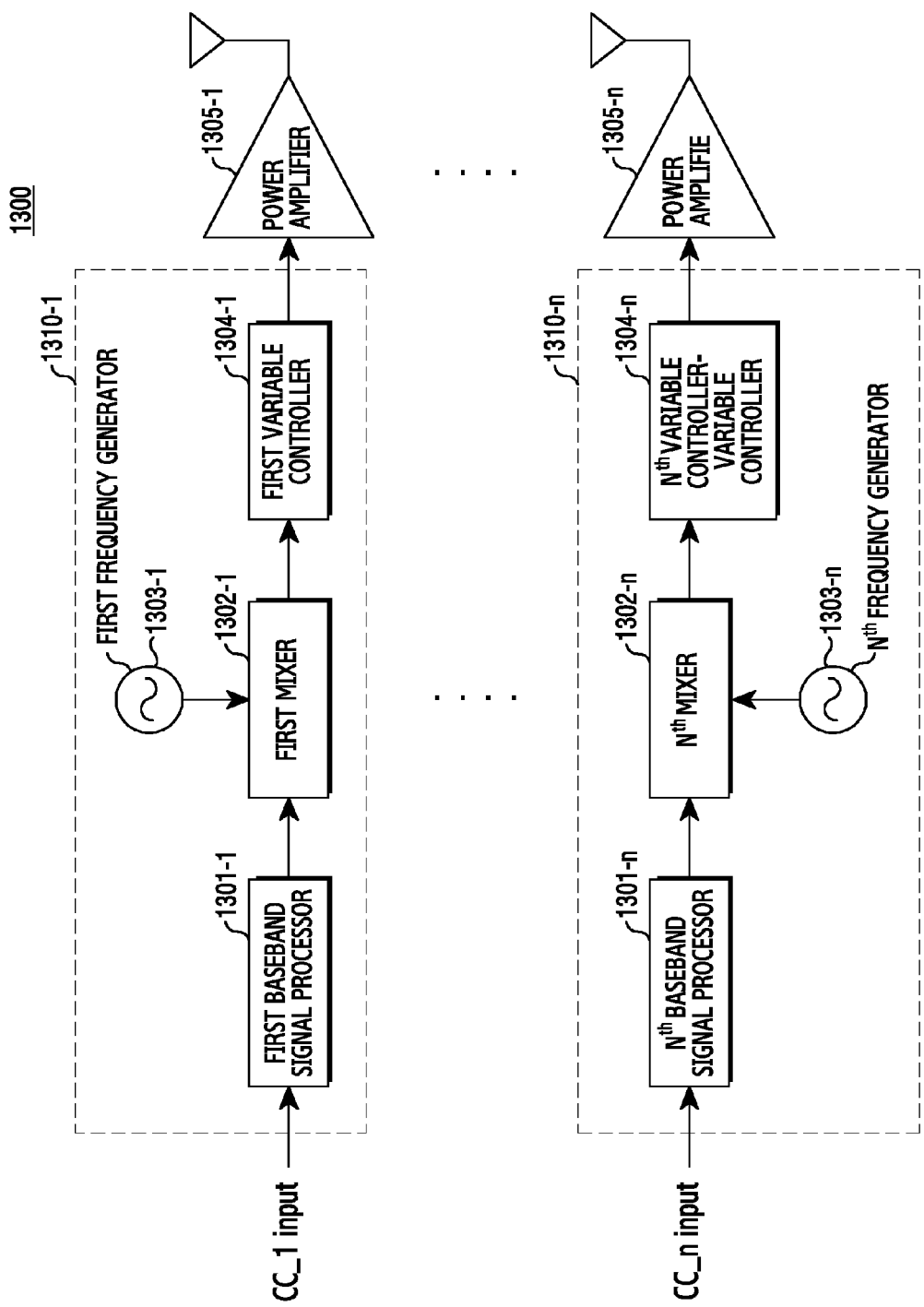
FIG. 13 illustrates a transmitter that supports CA using a plurality of CCs according to various embodiments of the present disclosure.

According to various embodiments of the present disclosure, a transmitter includes inter-band carrier aggregation as illustrated in FIG. 13.

FIG. 13 illustrates a transmitter that supports CA using n CCs according to various embodiments of the present disclosure.

Referring to FIG. 13, the transmitter 1300 includes a plurality of communication units 1310_1 to 1310_n and a plurality of power amplifiers 1305_1 to 1305_n. The plurality of communication units 1310_1 to 1310_n include a plurality of baseband signal processors 1301_1 to 1301_n, a plurality of mixers 1302_1 to 1302_n, a plurality of frequency generators 1303_1 to 1303_n, and a plurality of variable gain controllers 1304_1 to 1304_n.

A difference between the transmitter of FIG. 13 and the transmitter of FIG. 11 is that the transmitter of FIG. 13 uses a plurality of power amplifiers 1305_1 to 1305_n and a plurality of antennas without the use of the combiner 1105. When inter-band carriers are aggregated, the bandwidth range required for one power amplifier is wide. In an embodiment of the present disclosure a plurality of power amplifiers corresponding to the number of CCs for CA are used.

In another embodiment of the present disclosure, the transmitter 1100 includes a plurality of communication units 1110_1 to 1110_n, a single combiner 1105 and a single power amplifier 1106. The plurality of communication units 1110_1 to 1110_n produce a plurality of gain controlled inter-band RF signals which are combined in combiner 1105 and amplified by power amplifier 1106.

The plurality of baseband signal processors 1301_1 to 1301_n may be a module corresponding to the cellular module 221 of FIG. 2, and the plurality of mixers 1302_1 to 1302_n, the plurality of frequency generators 1303_1 to 1303_n, and the plurality of variable gain controllers 1304_1 to 1304_n may be a module corresponding to the RF module 229 of FIG. 2. For example, the plurality of mixers 1302_1 to 1302_n, the plurality of frequency generators 1303_1 to 1303_n, and the plurality of variable gain controllers 1304_1 to 1304_n may be implemented by one or multiple RFICs or RFIC packages.

The plurality of power amplifiers 1305_1 to 1305_n may be implemented by at least one Power Amplifier Module (PAM).

The plurality of baseband signal processors 1301_1 to 1301_n may perform the same function as that of the plurality of baseband signal processors 1101_1 to 1101_n.

The plurality of mixers 1302_1 to 1302_n may perform the same function as that of the plurality of mixers 1102_1 to 1102_n.

The plurality of frequency generators 1303_1 to 1303_n may perform the same function as that of the plurality of frequency generators 1103_1 to 1103_n.

The plurality of variable gain controllers 1304_1 to 1304_n may perform the same function as that of the plurality of variable gain controllers 1104_1 to 1104_n.

The plurality of power amplifiers 1305_1 to 1305_n may amplify RF signals from the plurality of variable gain controllers 1304_1 to 1304_n and output the amplified RF signals through an antenna.

In FIG. 13, a first CC and an nth CC may be different bands in the inter-band carrier aggregation illustrated in FIG. 8C.

Figure 14:
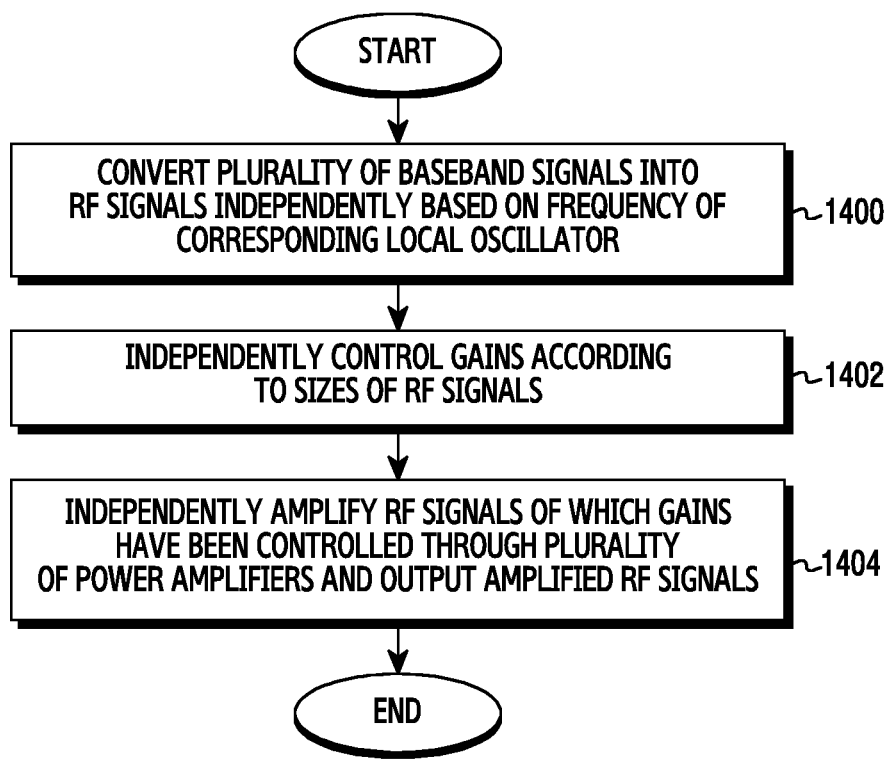
FIG. 14 is a flowchart illustrating an operation of the transmitter according to various embodiments of the present disclosure.

FIG. 14 is a flowchart illustrating an operation of the transmitter according to various embodiments of the present disclosure.

Referring to FIG. 14, the plurality of mixers 1302_1 to 1302_n converts baseband signals into RF signals independently based on corresponding local oscillation frequencies, respectively, in step 1400. For example, the first mixer 1302_1 may mix the frequency of the baseband signal from the first baseband signal processor 1301_1 and the first local oscillation frequency (LO) from the first frequency generator 1303_1 and make the mixed frequency transition to a new frequency. Similarly, the $n^{th}$ mixer 1302_n may mix the frequency of the baseband signal from the $n^{th}$ baseband signal processor 1301_n and the $n^{th}$ local oscillation frequency (LO) from the $n^{th}$ frequency generator 1303_n and generate the mixed frequency signal.

The plurality of variable gain controllers 1304_1 to 1304_n controls gains to uniformly maintain the power level of the first RF signal to the $n^{th}$ RF signal according to control signals thereof, respectively, in step 1402. For example, the first variable gain controller 1304_1 may reduce the gain when the output level of the first RF signal is high and increase the gain when the output level of the first RF is low. Similarly, the $n^{th}$ variable gain controller 1304_n may reduce the gain when the output level of the $n^{th}$ RF signal is high and increase the gain when the output level of the $n^{th}$ RF is low.

The plurality of power amplifiers 1305_1 to 1305_n amplifies and output RF signals from the plurality of variable gain controllers 1304_1 to 1304_n in step 1404.

Figure 15:
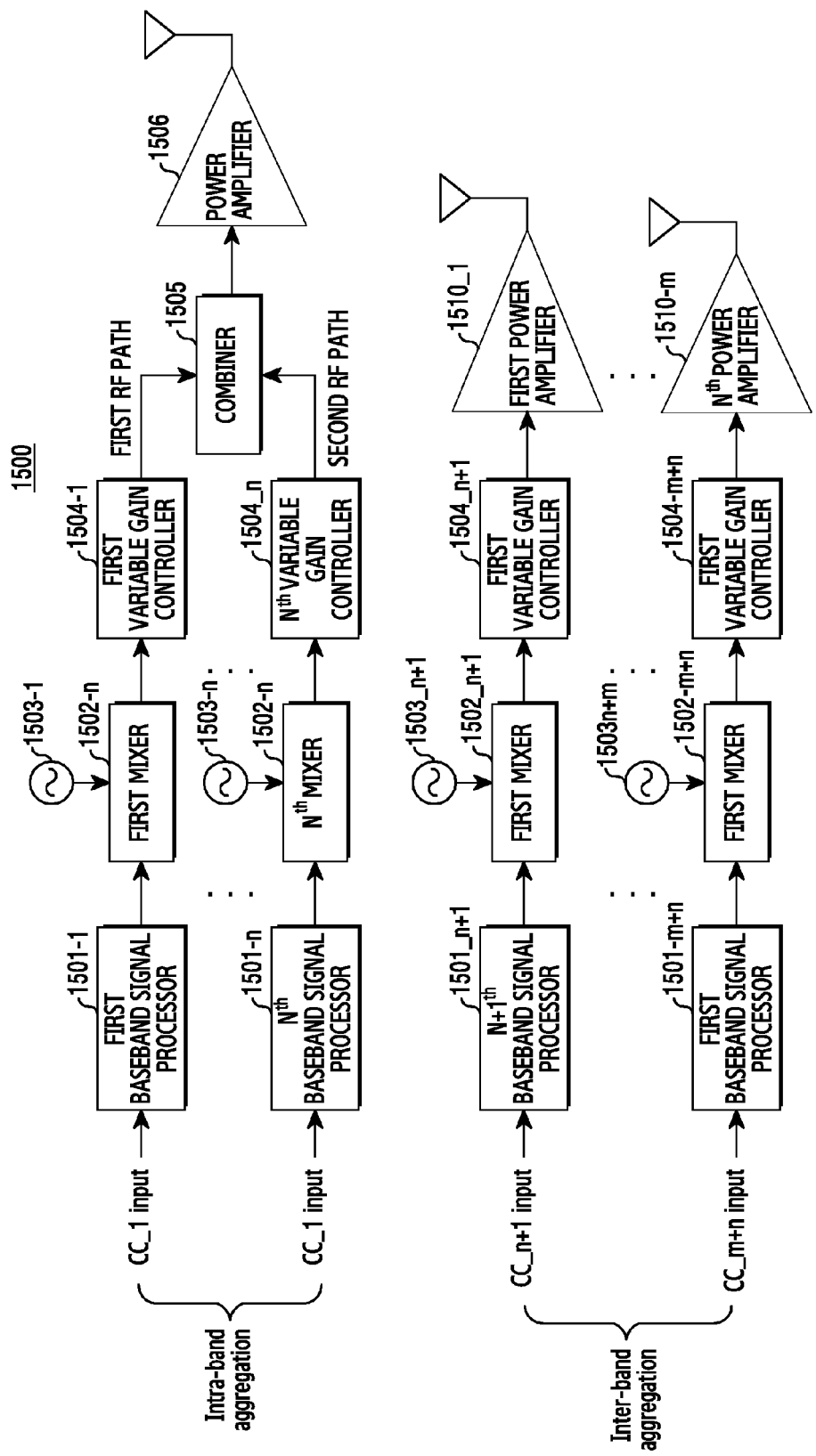
FIG. 15 illustrates a transmitter that supports CA using a plurality of CCs according to various embodiments of the present disclosure.

FIG. 15 illustrates a transmitter that supports CA using n CCs according to various embodiments of the present disclosure.

Referring to FIG. 15, a transmitter 1500 includes a plurality of baseband signal processors 1501_1 to 1501_m+n, a plurality of mixers 1502_1 to 1502_m+n, a plurality of frequency generators 1503_1 to 1503_m+n, a plurality of variable gain controllers 1504_1 to 1504_m+n, a combiner 1505, a power amplifier 1506, and a plurality of power amplifiers 1510_1 to 1510_m.

The plurality of baseband signal processors 1501_1 to 1501_m+n may be a module corresponding to the cellular module 221 of FIG. 2, and the plurality of mixers 1502_1 to 1502_m+n, the plurality of frequency generators 1503_1 to 1503_m+n, and the plurality of variable gain controllers 1504_1 to 1504_m+n, and the combiner 1505 may be a module corresponding to the RF module 229 of FIG. 2. For example, the plurality of mixers 1502_1 to 1502_m+n, the plurality of frequency generators 1503_1 to 1503_m+n, the plurality of variable gain controllers 1504_1 to 1504_m+n, and the combiner 1505 may be implemented by one or multiple RFICs or RFIC packages.

The plurality of baseband signal processors 1501_1 to 1501_m+n may perform the same function as that of the plurality of baseband signal processors 1101_1 to 1101_n and the plurality of baseband signal processors 1301_1 to 1301_n.

The plurality of mixers 1502_1 to 1502_m+n may perform the same function as that of the plurality of mixers 1102_1 to 1102_n and the plurality of mixers 1302_1 to 1302_n.

The plurality of frequency generators 1503_1 to 1503_m+n may perform the same function as that of the plurality of frequency generators 1103_1 to 1103_n and the plurality of frequency generators 1303_1 to 1303_n.

The plurality of variable gain controllers 1504_1 to 1504_m+n may perform the same function as that of the plurality of variable gain controllers 1104_1 to 1104_n and the plurality of variable gain controllers 1304_1 to 1304_n.

The combiner 1505 may perform the same function as that of the combiner 1105 of FIG. 11. For example, the combiner 1505 may combine the first RF signal to the $n^{th}$ RF signal of which the gains have been controlled by the plurality of variable gain controllers 1504_1 to 1504_n. Since the first CC and the $n^{th}$ CC have different frequency bands, the first RF signal and the $n^{th}$ RF signal may be distinguished in the frequency domain, but the first RF signal to the $n^{th}$ RF signal may be combined into one RF signal physically in the time domain.

The power amplifier 1506 may perform the same function as that of the power amplifier 1106 of FIG. 11. The power amplifier 1506 may amplify the output RF signal from the combiner 1505 and output the amplified RF signal through an antenna.

The plurality of power amplifiers 1510_1 to 1510_m may perform the same function as that of the plurality of power amplifiers 1305_1 to 1305_n.

The plurality of power amplifiers 1510_1 to 1510_m may amplify the RF signals from the plurality of variable gain controllers 1504_n+1 to 1504_m+n and output the amplified RF signals through antennas.

Figure 16:
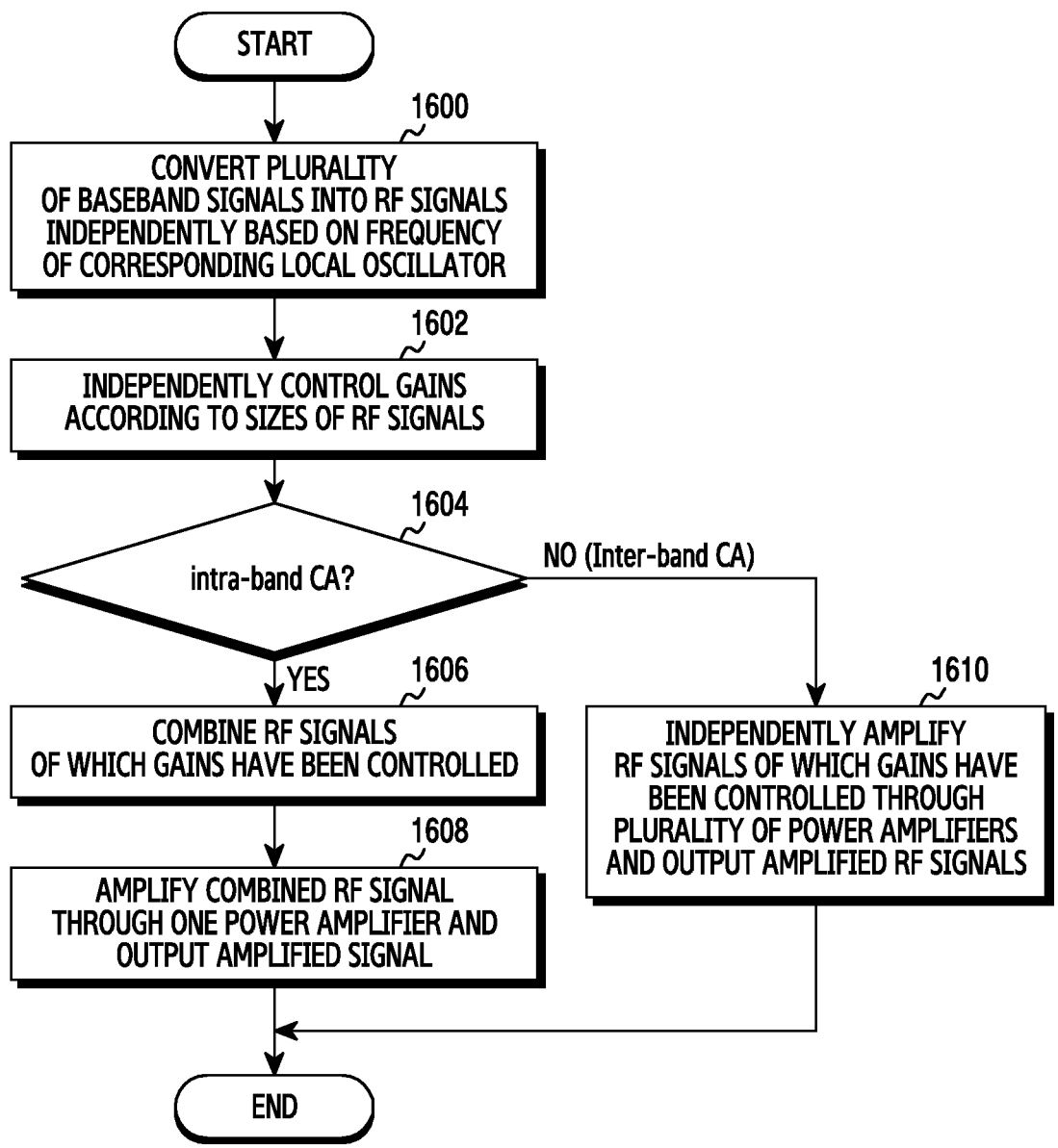
FIG. 16 is a flowchart illustrating an operation of the transmitter according to various embodiments of the present disclosure.

FIG. 16 is a flowchart illustrating an operation of the transmitter according to other various embodiments of the present disclosure.

Referring to FIG. 16, the plurality of mixers 1502_1 to 1502_m+n convert baseband signals into RF signals independently based on corresponding local oscillation frequencies, respectively, in step 1600. For example, the first mixer 1502_1 mixes the frequency of the baseband signal from the first baseband signal processor 1501_1 and the first local oscillation (LO) frequency from the first frequency generator 1503_1 and generates the mixed frequency RF signal. Similarly, the $m+n^{th}$ mixer 1502_m+n mixes the frequency of the baseband signal from the $m+n^{th}$ baseband signal processor 1501_m+n and the m+n$^{th}$ local oscillation frequency (LO) from the m+n$^{th}$ frequency generator 1503_m+n and generates the mixed frequency RF signal.

Although a separate controller is not illustrated in FIG. 15, the controller determines whether CA corresponds to intra-band CA in step 1604. The controller executes control to perform steps 1606 and 1608 when the CA corresponds to the intra-band CA, and controls to perform step 1610 when the CA does not correspond to the intra-band CA.

The combiner 1505 combines the first RF signal to the n$^{th}$ RF signal of which the gains have been controlled by the plurality of variable gain controllers 1504_1 to 1504_n in step 1606. Since the first CC and the n$^{th}$ CC have different frequency bands, the first RF signal and the n$^{th}$ RF signal may be distinguished in the frequency domain, but the first RF signal to the n$^{th}$ RF signal may be combined into one RF signal physically in the time domain.

The power amplifier 1506 amplifies and outputs the combined RF signal in step 1608.

The plurality of power amplifiers 1510_1 to 1510_m amplifies and outputs RF signals from the plurality of variable gain controllers 1504_n+1 to 1504_m+n in step 1610.

In the case of intra-band CA, the controller, which is not illustrated in FIG. 15, may control to combine the RF signals, of which the frequencies are independently converted and of which the gains are controlled, and to output the combined RF signal through one power amplifier. In the case of the inter-band CA, the controller may execute control to not combine the RF signals, of which the frequencies are independently converted and of which the gains are controlled, and to output the combined RF signal through a plurality of power amplifiers. In the case of the inter-band CA, the controller may alternatively control to combine the RF signals, of which the frequencies are independently converted and of which the gains are controlled, and to output the combined RF signal through a single power amplifier.

Figure 17:
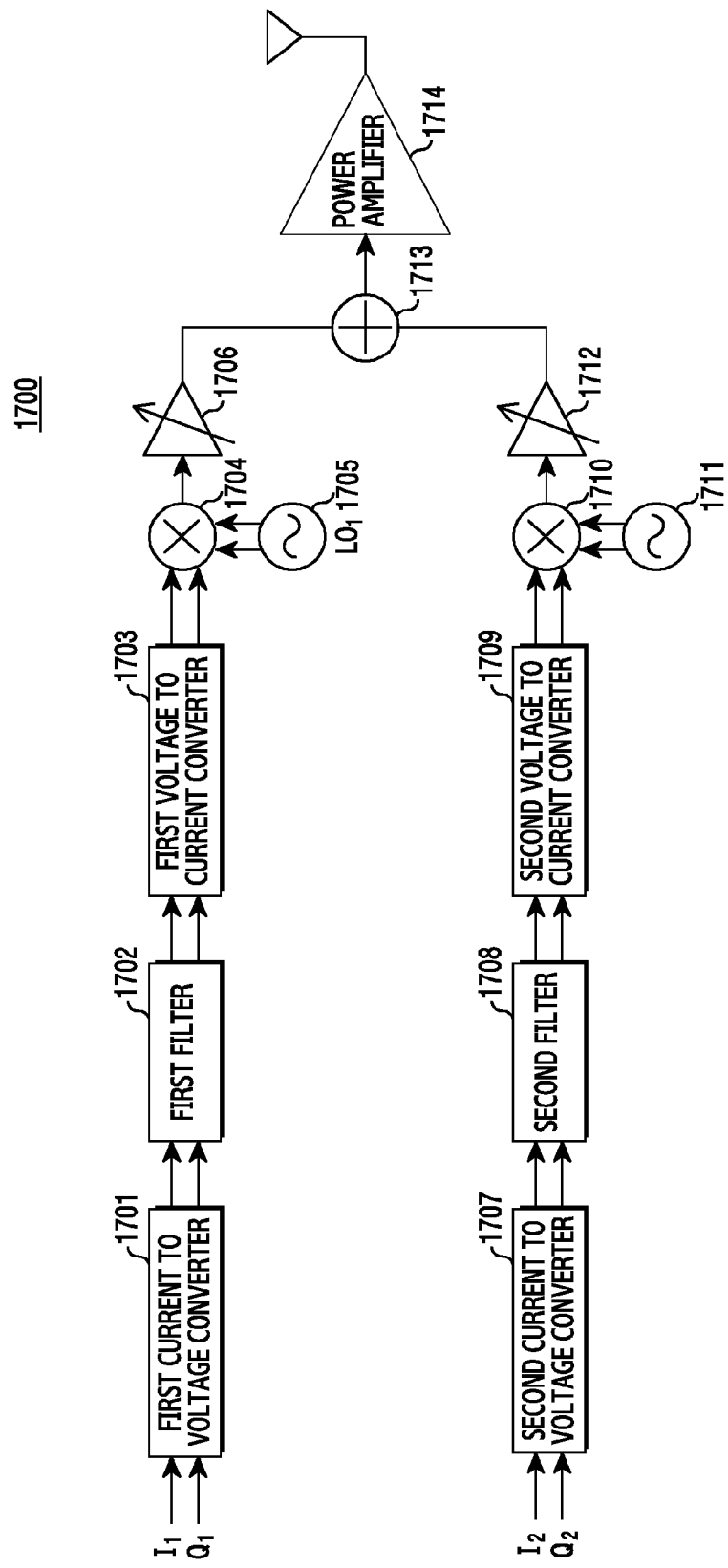
FIG. 17 illustrates a transmitter that supports CA using two CCs according to various embodiments of the present disclosure.

According to various embodiments of the present disclosure, as illustrated in FIG. 17, the transmitter may perform a current to voltage conversion, filtering, and voltage to current conversion function of the baseband signal in order to improve the performance before providing the baseband signal to the frequency mixer.

FIG. 17 illustrates a transmitter that supports CA using two CCs according to various embodiments of the present disclosure.

Referring to FIG. 17, a transmitter 1700 includes a first current to voltage converter 1701, a first filter 1702, a first voltage to current converter 1703, a first mixer 1704, a first frequency generator 1705, a first variable gain controller 1706, a second current to voltage converter 1707, a second filter 1708, a second voltage to current converter 1709, a second mixer 1710, a second frequency generator 1711, a second variable gain controller 1712, a combiner 1713, and a power amplifier 1714.

In an embodiment of the present disclosure using a current type Digital-Analog Converter (DAC) at a transmitting end, the first current to voltage converter 1701 and the second current to voltage converter 1707 may convert a current signal into a voltage signal in order to process each of the first baseband signal and the second baseband signals, respectively.

When the voltages of the first baseband signal and the second baseband signal pass through the DAC, the first filter 1702 and the second filter 1708 remove generated noise. For example, the first filter 1702 and the second filter 1708 may be implemented by a Low Pass Filter (LPF).

The first voltage to current converter 1703 and the second voltage to current converter 1709 may convert a current signal into a voltage signal in order to make the first baseband signal and the second baseband signal have a linear characteristic in the first mixer 1704 and the second mixer 1710.

The first mixer 1704 and the second mixer 1710 may make the first baseband signal and the second baseband signal, having passed through the first current to voltage converter 1701 and the second current to voltage converter 1707, the first filter 1702 and the second filter 1708, and the first voltage to current converter 1703 and the second voltage to current converter 1709, frequency-transition to RF signals.

The first mixer 1704 and the second mixer 1710 may perform the same function as that of the first mixer 902 and the second mixer 907 of FIG. 9.

The first frequency generator 1705 and the second frequency generator 1711 may perform the same function as that of the first frequency generator 903 and the second frequency generator 908 of FIG. 9.

The first variable gain controller 1706 and the second variable gain controller 1712 may perform the same function as that of the first variable gain controller 904 and the second variable gain controller 909 of FIG. 9.

The combiner 1713 may perform the same function as that of the combiner 910 of FIG. 9, and the power amplifier 1714 may perform the same function as that of the power amplifier 911 of FIG. 9.

Figure 18:
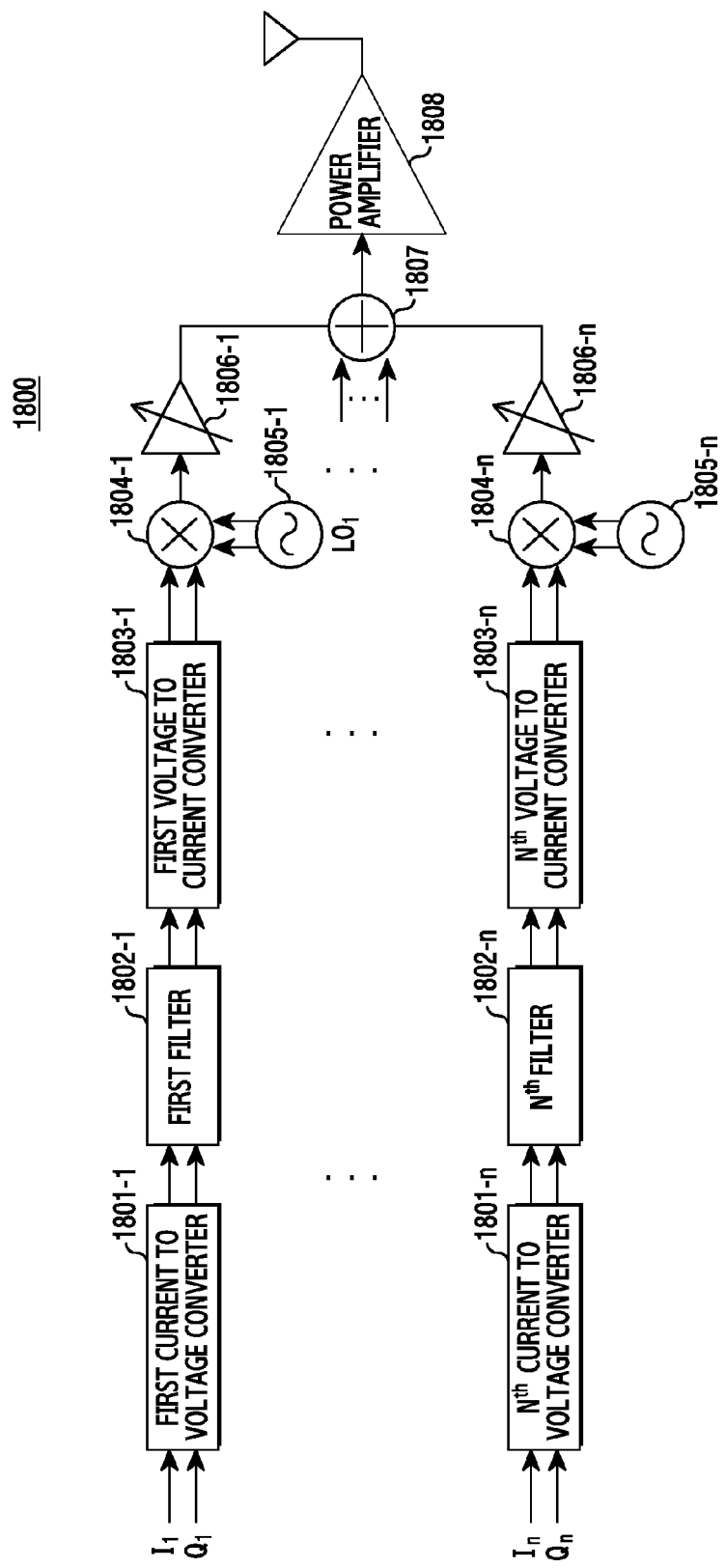
FIG. 18 illustrates a transmitter that supports CA using a plurality of CCs according to various embodiments of the present disclosure.

FIG. 18 illustrates a transmitter that supports CA using n CCs according to other various embodiments of the present disclosure.

Referring to FIG. 18, a transmitter 1800 includes a plurality of current to voltage converters 1801_1 to 1801_n, a plurality of filters 1802_1 to 1802_n, a plurality of voltage to current converters 1803_1 to 1803_n, a plurality of mixers 1804_1 to 804_n, a plurality of frequency generators 1805_1 to 1805_n, a plurality of variable gain controllers 1806_1 to 1806_n, a combiner 1807, and a power amplifier 1808.

The plurality of current to voltage converters 1801_1 to 1801_n may perform the same function as that of the first current to voltage converter 1701 and the second current to voltage converter 1707.

The plurality of filters 1802_1 to 1802_n may perform the same function as that of the first filter 1702 and the second filter 1708.

The plurality of voltage to current converters 1803_1 to 1803_n may perform the same function as that of the first voltage to current converter 1703 and the second voltage to current converter 1709.

The plurality of mixers 1804_1 to 1804_n may perform the same function as that of the first mixer 1704 and the second mixer 1710.

The plurality of frequency generators 1805_1 to 1805_n may perform the same function as that of the first frequency generator 1705 and the second frequency generator 1711.

The plurality of variable gain controllers 1806_1 to 1806_n may perform the same function as that of the first variable gain controller 1706 and the second variable gain controller 1712.

The combiner 1807 may perform the same function as that of the combiner 1713, and the power amplifier 1808 may perform the same function as that of the power amplifier 1714.

Figure 19B:
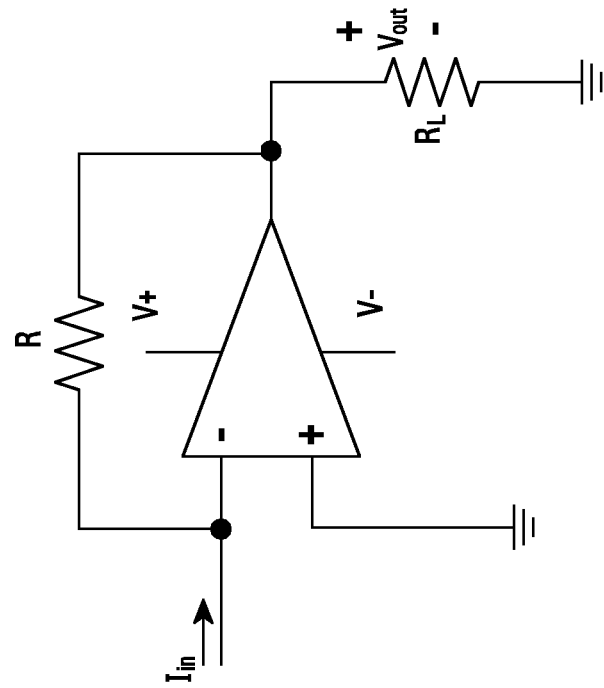
FIG. 19B illustrates a voltage to current (V2I) conversion circuit according to various embodiments of the present disclosure.
Figure 19A:
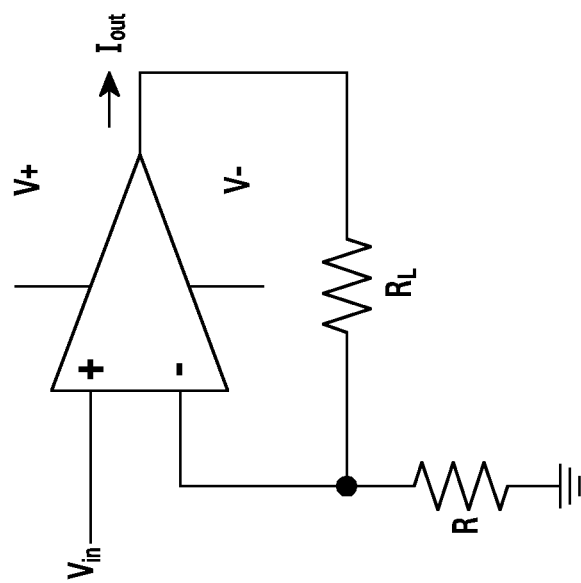
FIG. 19A illustrates a current to voltage (I2V) conversion circuit according to various embodiments of the present disclosure.

FIG. 19A illustrates a voltage to current conversion circuit according to various embodiments of the present disclosure.

The voltage to current conversion circuit illustrated in FIG. 19A is a voltage to current conversion circuit corresponding to a plurality of voltage to current converts $1803\_1$ to $1803\_n$.

Referring to FIG. 19A, the voltage to current conversion circuit may include one operation amplifier (OP-AMP) and two resistors (R and $R_L$).

An input voltage ($V_{in}$) is supplied to a positive (+) terminal of the operation amplifier. A first side of the resistor (R) is connected to a negative (−) terminal of the operation amplifier and a second side of the resistor (R) is grounded. The resistor ($R_L$) has a first side connected to an output terminal of the operation amplifier and a second side connected to the first side of the resistor (R) or the negative (−) terminal of the operation amplifier.

When the input voltage ($V_{in}$) is input to the positive (+) terminal of the operation amplifier, the input voltage ($V_{in}$) may be converted into an output current ($I_{out}$) and supplied to an output terminal of the operation amplifier.

Preferably, the output current ($I_{out}$) may be defined as the input voltage ($V_{in}$)/resistor (R) regardless of the resistor ($R_L$).

The voltage to current conversion circuit of FIG. 19A is an embodiment of the present disclosure. However, the voltage to current conversion circuit is not limited to the embodiment of FIG. 19A and various forms of voltage to current conversion circuits may be applied to the present disclosure.

FIG. 19B illustrates a current to voltage conversion circuit according to various embodiments of the present disclosure.

The current to voltage conversion circuit illustrated in FIG. 19B is a current to voltage conversion circuit corresponding to a plurality of current to voltage converters $1801\_1$ to $1801\_n$.

Referring to FIG. 19B, the current to voltage conversion circuit includes one operation amplifier (OP-AMP) and two resistors (R and $R_L$).

An input current ($I_{in}$) is supplied to a negative (−) terminal of the operation amplifier. A first side of the resistor (R) is connected to the negative (−) terminal of the operation amplifier and a second side of the resistor (R) is connected to an output terminal of the operation amplifier. The resistor ($R_L$) has a first side connected to the output terminal of the operation amplifier or the second side of the resistor (R), and a second side, which is grounded.

When the input current ($I_{in}$) is input to the negative (−) terminal of the operation amplifier, the input current ($I_{in}$) may be converted into an output voltage ($V_{out}$) and supplied to the output terminal of the operation amplifier.

Preferably, the output voltage ($V_{out}$) may be defined as the input current ($I_{in}$)*resistor (R) regardless of the resistor ($R_L$).

The current to voltage conversion circuit of FIG. 19B illustrates an embodiment of the present disclosure. However, the current to voltage conversion circuit is not limited the embodiment of FIG. 19B, and various forms of current to voltage conversion circuits may be applied to the present disclosure.

Figure 20:
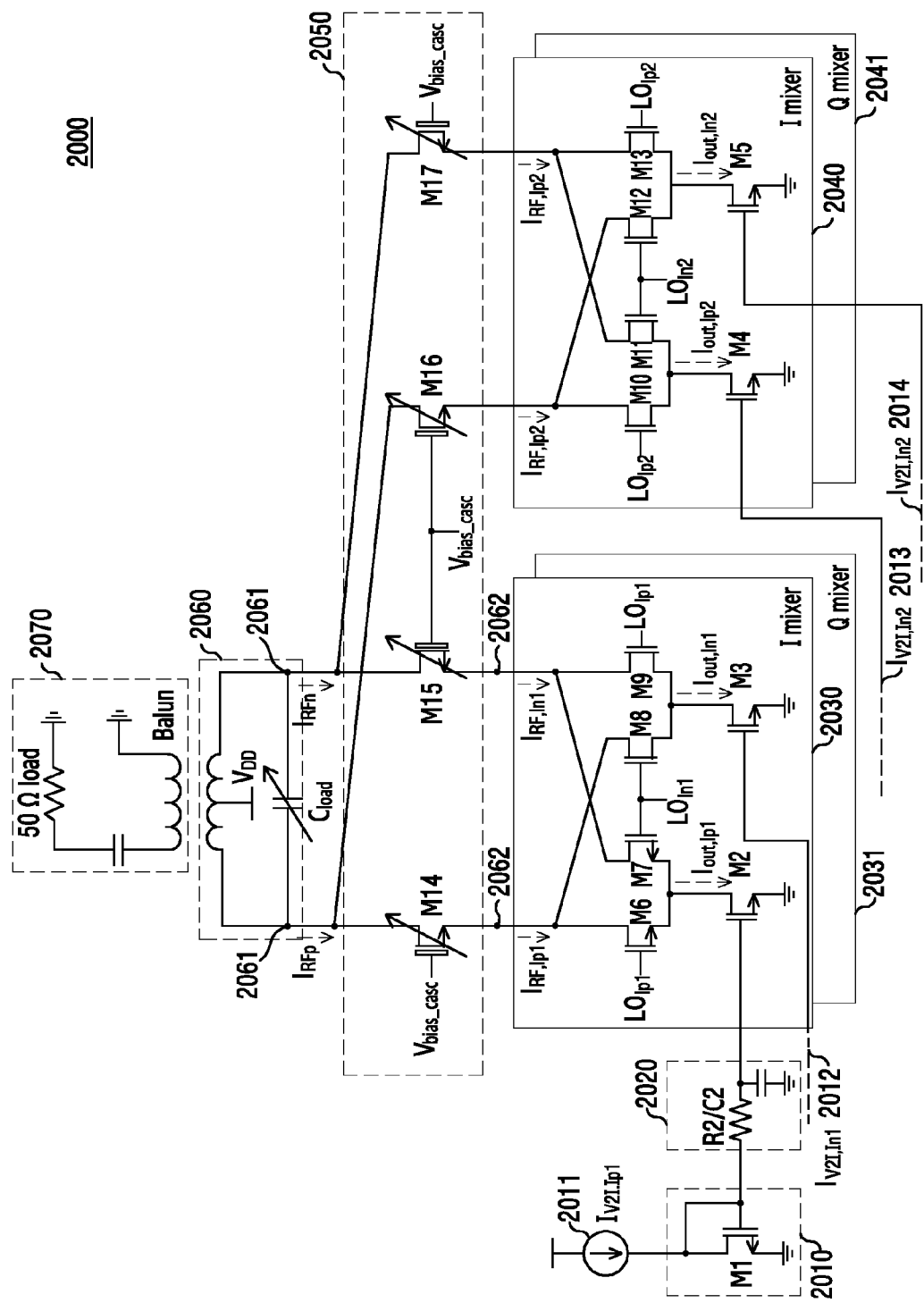
FIG. 20 illustrates a circuit of a transmitter that supports CA using two CCs according to various embodiments of the present disclosure.

FIG. 20 illustrates a circuit corresponding to a transmitter that supports CA using two CCs according to various embodiments of the present disclosure.

The circuit illustrated in FIG. 20 is a circuit corresponding to the mixers 902 and 907, the variable gain controllers 904 and 906, and the combiner 910 of FIG. 9. According to various embodiments of the present disclosure, the circuit illustrated in FIG. 20 is a circuit corresponding to the mixers 1704 and 1710, the variable gain controllers 1706 and 1712, and the combiner 1713 of FIG. 17.

Referring to FIG. 20, an RF module 2000 of the transmitter to implement intra-band non-contiguous CA includes an input circuit including a current mirror 2010 and an RC filter 2020, frequency conversion circuits 2030, 2031, 2040, and 2041 that combine the baseband signal from the input circuit with the local oscillation frequency (LO), a variable gain control circuit 2050 including a plurality of variable amplifiers, and a load circuit including an LC resonance circuit 2060 and a balun circuit 2070.

The input circuit corresponds to MOSFETs M1, M2, M3, M4, and M5. The input circuit transfers the baseband signals, which are converted into current signals by voltage to current conversion circuits, which are not shown (for example, the voltage to current converters $1803\_1$ to $1803\_n$ of FIG. 18) to the frequency conversion circuits 2030, 2031, 2040, and 2041 without any deterioration of linearity. When $I_{V2I,Ip1}$ 2011 is one of quadrature signals of a first CC, $I_{V2I,Ip1}$ is converted into $I_{out,Ip1}$ by M1 and M2 corresponding to the current mirror circuit 2010 with minimized linearity deterioration. At this time, the ratio of $I_{out,Ip1}$ and $I_{V2I,Ip1}$ signals is determined as the ratio (W2/L2)/(W1/L1) of M1 and M2, and the gain and linearity of the whole RF path (for example, mixer to variable gain controller to combiner) is determined through the proper ratio. When $I_{V2I,Ip1}$ is mirrored and transferred to $I_{out,Ip1}$, a filter 2020 of R2 & C2 is added to remove signal noise.

When $I_{V2I,In1}$ 2012 is one of the differential signals corresponding to the quadrature signals of the first CC, $I_{V2I,In1}$ is converted into $I_{out,In1}$ by M1 and M3 corresponding to the current mirror circuit 2010 with minimized linearity deterioration. At this time, the ratio of $I_{out,In1}$ and $I_{V2I,In1}$ signals is determined as the ratio (W3/L3)/(W1/L1) of M1 and M3, and the gain and linearity of the whole RF path (for example, mixer to variable gain controller to combiner) may be determined through the proper ratio. When $I_{V2I,In1}$ is mirrored and transferred to $I_{out,In1}$, the filter 2020 of R2 & C2 is added to remove signal noise.

Similarly, $I_{V2I,Ip1}$ and $I_{V2I,In1}$ may be converted into $I_{out,Ip1}$ and $I_{out,In1}$ with respect to the in phase (I) signal of the first CC.

Further, when $I_{V2I,Ip2}$ 2013 is one of quadrature signals of a second CC, $I_{V2I,Ip2}$ is converted into $I_{out,Ip2}$ by M1 and M4 corresponding to the current mirror circuit 2010 with minimized linearity deterioration. At this time, the ratio of $I_{out,Ip2}$ and $I_{V2I,Ip2}$ signals is determined as the ratio (W4/L4)/(W1/L1) of M1 and M4, and the gain and linearity of the whole RF path (for example, mixer to variable gain controller to combiner) may be determined through the proper ratio. When $I_{V2I,Ip2}$ is mirrored and transferred to $I_{out,Ip2}$, the filter 2020 of R2 & C2 is added to remove signal noise.

When $I_{V2I,In2}$ 2014 is one of the differential signals corresponding to the quadrature signals of the second CC, $I_{V2I,In2}$ is converted into $I_{out,In1}$ by M1 and M5 corresponding to the current mirror circuit 2010 with minimized linearity deterioration. At this time, the ratio of $I_{out,In2}$ and $I_{V2I,In2}$ signals may be determined as the ratio (W5/L5)/(W1/L1) of M1 and M3, and the gain and linearity of the whole RF path (for example, mixer to variable gain controller to combiner) is determined through the proper ratio. When $I_{V2I,1n2}$ is mirrored and transferred to $I_{out,In2}$, the filter 2020 of R2 & C2 is added to remove signal noise.

Similarly, $I_{V2I,In2}$ and $I_{V2I,In2}$ may be converted into $I_{out,Ip2}$ and $I_{out,In2}$ with respect to the In-phase (I) signal of the second CC.

The frequency conversion circuits 2030, 2031, 2040, and 2041 including MOSFETs M6, M7, M8, M9, M10, M11, M12, and M13 frequency-convert current signals (that is, baseband signals) transferred through the input circuit.

For example, M6, M7, M8, and M9 constitute the frequency converter of the In-phase (I) path for CC1, and there is the frequency converter of the Quadrature (Q) path. The frequency converters M6, M7, M8, and M9 of the In-phase path and the frequency converter of the Q path are driven in I path Local Oscillators $LO_{Ip1}$ and $LO_{In2}$ and a Q path LO, corresponding to $f_{LOI}$, so that a frequency conversion of CC1 to $f_{LOI}$ may be performed. For example, $I_{out,Ip1}$ may be converted into $I_{RF,Ip1}$, and $I_{out,In1}$ may be converted into $I_{RF,In1}$.

The same process may be performed in the frequency converters M10, M11, M12, and M13 of the I path for CC2 and the frequency converter (not shown) of the Q path. At this time, the frequency converter for CC2 may be frequency-converted into $f_{LO2}$. For example, $I_{out,Ip2}$ may be converted into $I_{RF,Ip2}$, and $I_{out,In2}$ may be converted into $I_{RF,In2}$.

At this time, $f_{LO1}$ and $f_{LO2}$ may be signals having the local oscillation frequencies independently generated by the frequency generators 1705 and 1710, respectively.

CC1 is expressed by RF signals $I_{RF,Ip1}$ and $I_{RF,In1}$ having $f_{LO1}$ through a frequency conversion process. Similarly, outputs of the frequency converter for CC2 having $f_{LO2}$ are $I_{RF,Ip2}$ and $I_{RF,In2}$. RF signals, $I_{RF,Ip1}$ $I_{RF,In1}$, $I_{RF,Ip2}$, and $I_{RF,In2}$ may be input into the variable gain control circuit 2050.

The variable gain control circuit 2050 includes a plurality of variable gain amplifiers. For example, M14 and M15 are variable gain amplifiers for $I_{RF,Ip1}$ and $I_{RF,In1}$ corresponding to the CC1 signal, and M16 and M17 are variable gain amplifiers for $I_{RF,Ip2}$ and $I_{RF,In2}$ corresponding to the CC2 signal.

M14, M15, M16, and M17 control the gain of the RF signals $I_{RF,Ip1}$, $I_{RF,In1}$, $I_{RF,Ip2}$, and $I_{RF,In2}$ according to a control signal ($V_{bias\text{-}case}$) corresponding to a digital control code.

Figure 21:
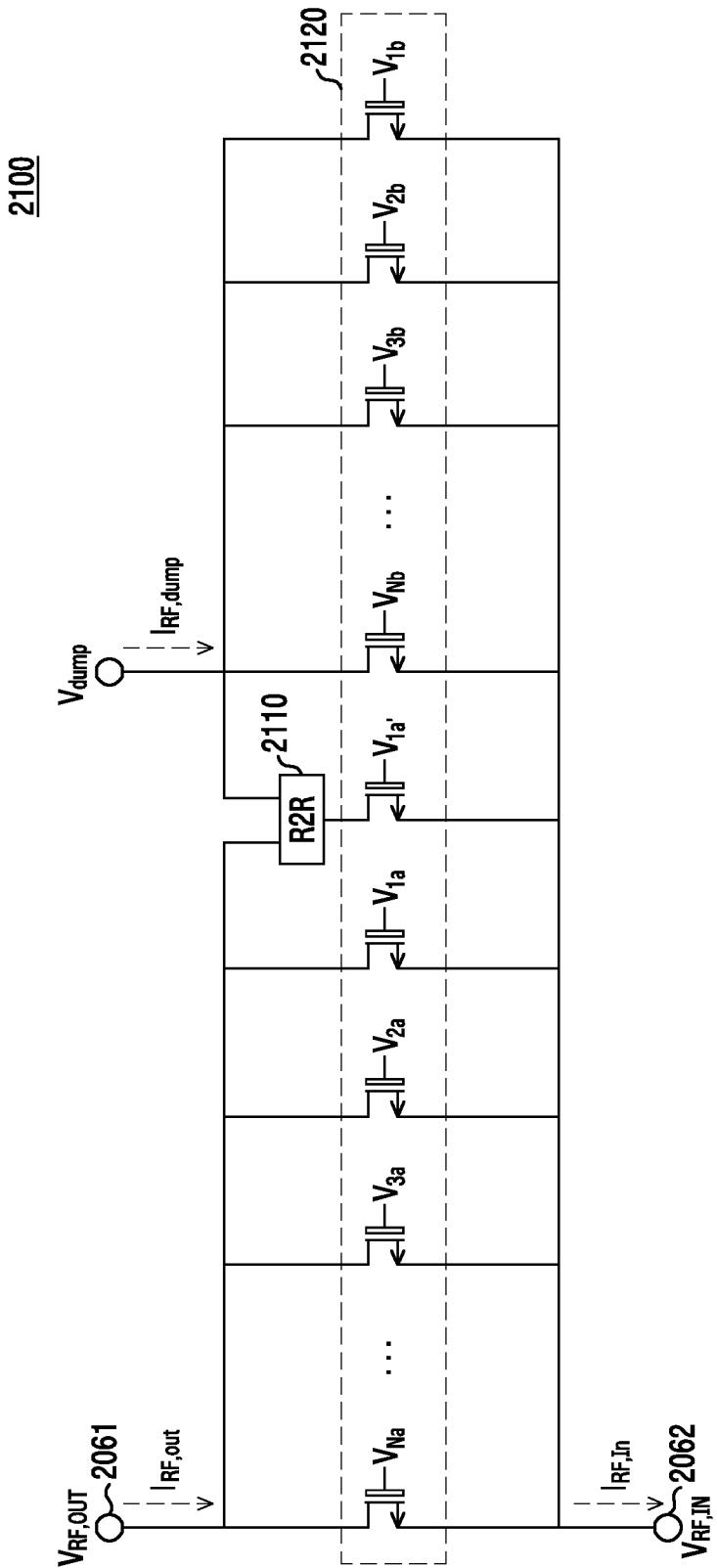
FIG. 21 is a detailed circuit diagram of a variable gain controller using a resistor to resistor (R2R) resistor ladder network circuit according to various embodiments of the present disclosure.
Figure 22:
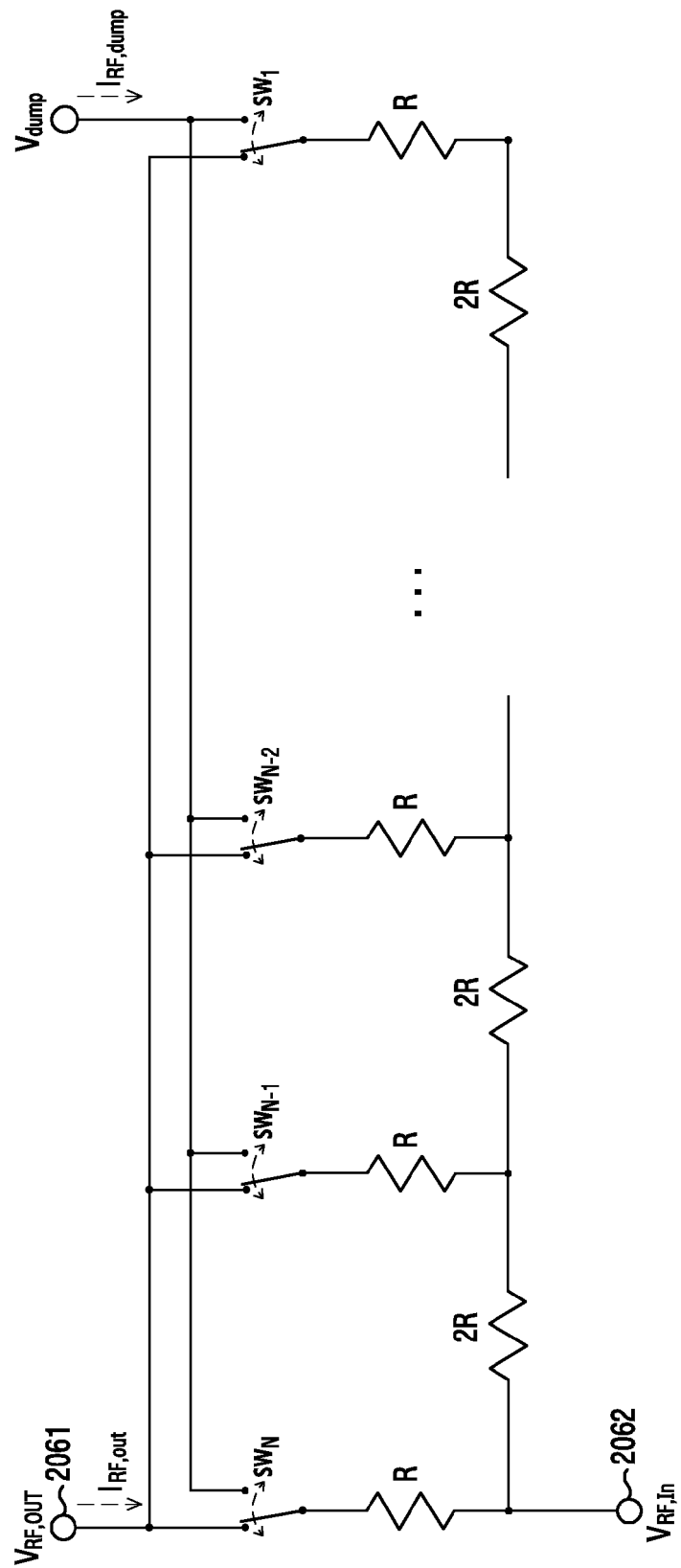
FIG. 22 is an R2R ladder network circuit diagram according to various embodiments of the present disclosure.

According to various embodiments of the present disclosure, M14, M15, M16, and M17 may be implemented by a current steering circuit of FIG. 21 or a variable gain circuit of an R2R ladder circuit of FIG. 22.

The gain-controlled RF signals $I_{RF,Ip1}$, $I_{RF,In1}$, $I_{RF,Ip2}$, and $I_{RF,In2}$ are combined and output to an output terminal 2061 of the variable gain control circuit 2050 as $I_{RFp}$ and $I_{RFn}$. For example, one of differential signals of CC1 and CC2 may be shown at the output terminal 2061 as $I_{RFp}$ ($=I_{RF,Ip1}+I_{RF,Ip2}$) and the other one of the differential signals of CC1 and CC2 may be shown at the output terminal 2061 as $I_{RFn}(=I_{RF,In1}+I_{RF,In2})$. The output terminal 2061 of the variable gain control circuit 2050 may correspond to the input of the combiner 1713 of FIG. 17.

Since the RF signals $I_{RF,Ip1}$, $I_{RF,In1}$, $I_{RF,Ip2}$, and $I_{RF,In2}$ of the two CCs of which the frequencies are independently converted and of which the gains are independently controlled are all current signals, the RF signals $I_{RF,Ip1}$, $I_{RF,In1}$, $I_{RF,Ip2}$, and $I_{RF,In2}$ may be easily combined through aggregation in one node (for example, the output terminal 2061).

Accordingly, with respect to two output current signals $I_{RFp}$ and $I_{RFn}$, the signals are combined, the current signals are converted into voltage signals, and the signals are transferred to the output at the same time through a balanced-unbalanced (balun) circuit 2070 and an LC resonance circuit 2060 including $C_{load}$.

For example, the LC resonance circuit 2060 combines the two output current signals $I_{RFp}$ and $I_{RFn}$ and converts the combined current signal into the voltage signal. Further, the LC resonance circuit 2060 may maximize the voltage conversion by allowing the resonant frequency to have a maximum impedance value. The resonant frequency of the LC resonance circuit 2060 may be controlled by varying at least one of inductance (L) and capacitance (C).

The balun circuit 2070 may serve to convert a balanced signal into an unbalanced signal or an unbalanced signal into a balanced signal. For example, the balun circuit 2070 may convert a single-ended signal into a differential signal or a differential signal into a single-ended signal. Further, the balun circuit 2070 may perform an impedance conversion according to ohm load impedance.

The variable gain control circuit 2050 and the frequency conversion circuits 2030, 2031, 2040, and 2041 are connected in a cascade type and thus have high output impedance. Accordingly, there are advantages of excellent linearity which is an important performance index of the transmitter. FIG. 21 is a detailed circuit diagram of a variable gain amplifier using an R2R ladder circuit according to various embodiments of the present disclosure.

Referring to FIG. 21, a circuit for implementing a Variable Gain Amplifier VGA (M14, M15, M16, and M17) for a variable gain by a current steering circuit 2120 and an R2R attenuator 2110 is illustrated. $I_{RF,In}$ corresponding to an input signal of the VGA is divided into a plurality of transistors having properly different sizes according to the size thereof. Accordingly, a ratio of input and output currents is determined by the number of transistors connected to the node $V_{RF,Out}$ and the number of transistors connected to the node $V_{dump}$, and a very accurate, high frequency VGA may be implemented.

FIG. 22 illustrates an R2R ladder circuit according to various embodiments of the present disclosure.

Referring to FIG. 22, the R2R ladder circuit includes a series of switches SW1 to SWN. The R2R ladder circuit may receive an N-bit digital signal from a controller to turn on/off the switches SW1 to SWN, so that a voltage level corresponding to the digital input signal may be output.

Figure 23:
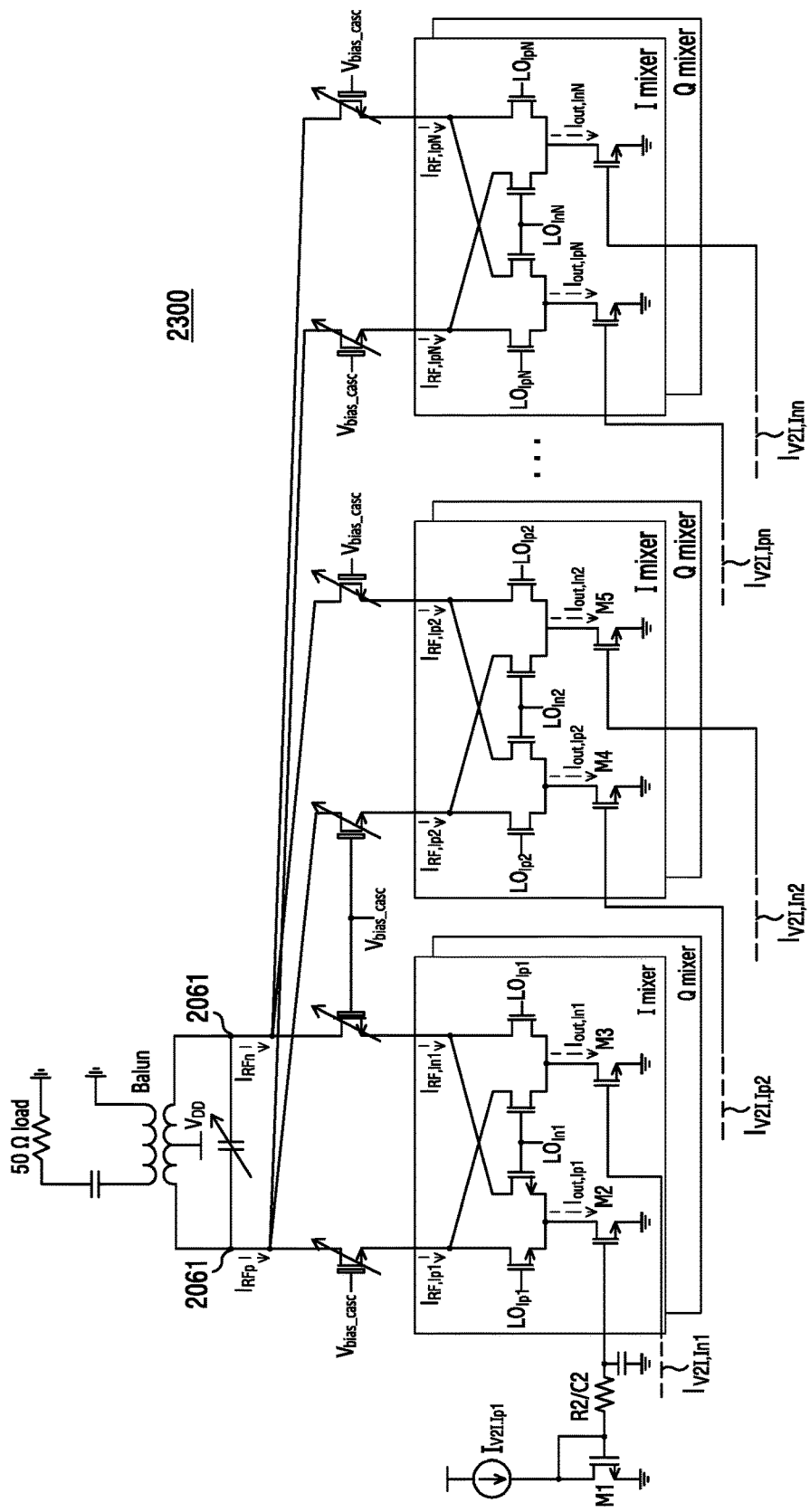
FIG. 23 is a circuit diagram corresponding to a transmitter that supports CA using a plurality of CCs according to various embodiments of the present disclosure.

FIG. 23 is a circuit diagram corresponding to a transmitter that supports CA using n CCs according to various embodiments of the present disclosure.

FIG. 23 illustrates a circuit corresponding to the mixers 1102_1 to 1102_n, the variable gain controllers 1104_1 to 1104_n, and the combiner 1105 of FIG. 11.

According to various embodiments of the present disclosure, the circuit illustrated in FIG. 23 is a circuit corresponding to the mixers 1804_1 to 1804_n, the variable gain controllers 1806_1 to 1806_n, and the combiner 1807 of FIG. 18.

An RF module 2000 of FIG. 20 is an RF module in the CA structure of aggregating two CCs, and an RF module 2300 in FIG. 23 is an RF module in the CA structure of aggregating n CCs.

Referring to the description of the RF module 2300 in FIG. 23, which is the same as that of the RF module 2000 in FIG. 20, except for the number of frequency conversion circuits and the number of variable gain amplifiers.

RF signals $I_{RF,Ip1}$, $I_{RF,In1}$, $I_{RF,Ip2}$, $I_{RF,In2}$, . . . , $I_{RF,Ipn}$, and $I_{RF,Inn}$ of which gains are controlled are combined are output to the output terminal as $I_{RFp}$ and $I_{RFn}$. For example, one of the differential signals of CC1 and CC2 may be shown at the output terminal 2061 as $I_{RFp}$ ($=I_{RF,Ip1}+I_{RF,Ip2}+,\ldots,+I_{RF,Ipn}$ and the other one of the differential signals of CC1 and CC2 may be shown at the output terminal 2061 as $I_{RFn}(=I_{RF,In1}+I_{RF,In2}+,\ldots,+I_{RF,In2})$.

As described above, the RF module independently combines frequencies through two or more frequency mixers, independently control gains of CCs, and combine CCs of which frequencies have been converted.

The structure provided by the present disclosure may perform the frequency conversion on current inputs according to each CC, perform the independent gain control on output currents through the Variable Gain Amplifier (VGA), and then add the output currents.

Methods stated in claims and/or specifications according to various embodiments of the present disclosure may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the above may form a memory in which the program is stored. Further, a plurality of such memories may be included in the electronic device.

The programs may be stored in an attachable storage device that is accessible through a communication network, such as the Internet, the Intranet, a Local Area Network (LAN), Wide LAN (WLAN), or Storage Area network (SAN), or a communication network configured with a combination thereof. The storage devices may be connected to an electronic device through an external port.

Further, a separate storage device on the communication network may access a portable electronic device.

Although the embodiments of the present disclosure have been described for illustrative purposes, those skilled in the art will appreciate that various modifications, additions and substitutions are possible, without departing from the scope and spirit of the disclosure.

Therefore, the embodiments disclosed in the present disclosure are intended to illustrate the scope of the technical idea of the present disclosure, and the scope of the present disclosure is not limited by the embodiments described. The scope of the present disclosure shall be construed on the basis of the accompanying claims in such a manner that all of the technical ideas included within the scope equivalent to the claims belong to the present disclosure.

What is claimed is:

1. A transmitter comprising:
    a first communication unit configured to convert a first baseband signal into a first radio frequency (RF) signal of a first band;
    a second communication unit configured to convert a second baseband signal into a second RF signal of a second band;
    a controller configured to determine whether a carrier aggregation (CA) type of the first band and the second band corresponds to intra-band CA or inter-band CA;
    a combiner configured to output a third RF signal by combining the first RF signal and the second RF signal, when the CA type corresponds to intra-band CA; and
    at least one amplifier configured to amplify the third RF signal when the CA type corresponds to intra-band CA, and configured to independently amplify the first RF signal and the second RF signal when the CA type corresponds to inter-band CA.

2. The transmitter of claim 1, wherein the first communication unit and the second communication unit each comprise:
    a baseband signal processor configured to process the baseband signal;
    a mixer configured to convert the baseband signal into an RF signal by using a local oscillation frequency; and
    a variable gain controller configured to control a gain of the RF signal.

3. The transmitter of claim 2, wherein the mixer is configured as an amplifier having a cascade structure.

4. The transmitter of claim 2, wherein the variable gain controller is configured as a current steering circuit and a resistor to resistor (R2R) attenuator.

5. The transmitter of claim 2, further comprising a resonance circuit electrically connected to an output terminal of the variable gain controller.

6. The transmitter of claim 5, further comprising a balun circuit electrically connected to the resonance circuit.

7. The transmitter of claim 2, further comprising:
    a current to voltage converter configured to convert a current signal of the baseband signal into a voltage signal, the current to voltage converter being connected to the mixer;
    a filter for removing noise from the baseband signal of which the current signal has been converted into the voltage signal; and
    a voltage to current converter configured to convert the voltage signal of the baseband signal from which the noise has been removed into a current signal.

8. The transmitter of claim 7, further comprising a current mirror configured to copy the baseband signal of which the voltage signal has been converted into the current signal.

9. The transmitter of claim 1, wherein the first band and the second band correspond to non-contiguous or contiguous intra-band frequencies for uplink CA.

10. The transmitter of claim 1, wherein the first band and the second band correspond to non-contiguous inter-band frequencies for uplink CA.

11. The transmitter of claim 1, further comprising a third communication unit configured to convert a third baseband signal into a fourth RF signal of a third band, wherein the combiner is further configured to generate a fifth RF signal by combining the third RF signal and the fourth RF signal.

12. A method of operating a transmitter, the method comprising:
    converting a first baseband signal into a first radio frequency (RF) signal of a first band;
    converting a second baseband signal into a second RF signal of a second band;
    determining whether a carrier aggregation (CA) type of the first band and the second band corresponds to intra-band CA or inter-band CA;
    generating a third RF signal by combining the first RF signal and the second RF signal, when the CA type corresponds to intra-band CA; and amplifying the third RF signal according to the determined CA type when the CA type corresponds to intra-band CA, and configured to independently amplify the first RF signal and the second RF signal when the CA type corresponds to inter-band CA.

13. The method of claim 12, wherein converting the first baseband signal and converting the second baseband signal comprises:
processing the baseband signal;
converting the baseband signal into an RF signal by using a local oscillation frequency and a mixer; and
controlling a gain of the RF signal.

14. The method of claim 13, further comprising:
converting a current signal of the baseband signal into a voltage signal, the current to voltage converter being connected to the mixer;
removing noise of the baseband signal of which the current signal has been converted into the voltage signal; and
converting the voltage signal of the baseband signal from which the noise has been removed into a current signal.

15. The method of claim 14, further comprising copying the baseband signal of which the voltage signal has been converted into the current signal.

16. The method of claim 12, wherein the first band and the second band correspond to non-contiguous or contiguous intra-band frequencies for uplink CA.

17. The method of claim 12, wherein the first band and the second band correspond to non-contiguous inter-band frequencies for uplink CA.

18. An integrated circuit comprising:
a first communication unit configured to generate a first radio frequency (RF) signal of a first band by converting a first baseband signal;
a second communication unit configured to generate a second RF signal of a second band by converting a second baseband signal;
a controller configured to determine whether a carrier aggregation (CA) type of the first band and the second band corresponds to intra-band CA or inter-band CA
a combiner configured to generate a third RF signal by combining the first RF signal and the second RF signal, when the CA type corresponds to intra-band CA; and
at least one amplifier for generating an amplified signal by amplifying the third RF signal when the CA type corresponds to intra-band CA, and configured to independently amplify the first RF signal and the second RF signal when the CA type corresponds to inter-band CA.

19. The circuit of claim 18, wherein the first band and the second band correspond to non-contiguous or contiguous intra-band frequencies for uplink CA.

20. The circuit of claim 18, wherein the first band and the second band correspond to non-contiguous inter-band frequencies for uplink CA.

* * * * *